United States Patent
Kobayashi

(10) Patent No.: US 8,817,288 B2
(45) Date of Patent: Aug. 26, 2014

(54) INFORMATION PROCESSING SYSTEM, MANAGEMENT METHOD, AND STORAGE MEDIUM FOR PLACING AN APPLICATION AFTER AN IMAGE FORMING APPARATUS HAS BEEN ARRANGED

(71) Applicant: Canon Kabushiki Kaisha, Tokyo (JP)

(72) Inventor: Makoto Kobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/785,463

(22) Filed: Mar. 5, 2013

(65) Prior Publication Data

US 2013/0235407 A1    Sep. 12, 2013

(30) Foreign Application Priority Data

Mar. 12, 2012    (JP) .................... 2012-054082

(51) Int. Cl.
*G06F 3/12*    (2006.01)
*H04N 1/00*    (2006.01)

(52) U.S. Cl.
CPC .... *H04N 1/00244* (2013.01); *H04N 2201/0082* (2013.01); *H04N 1/00344* (2013.01); *H04N 1/00938* (2013.01); *H04N 2201/0093* (2013.01); *H04N 1/00973* (2013.01)
USPC ......... 358/1.13; 358/1.15; 717/168; 717/170; 717/173; 717/178

(58) Field of Classification Search
CPC .......... H04N 1/00344; H04N 1/00938; G06F 3/1204; G06F 3/123; G06F 3/1285; G06F 8/65
USPC ......... 358/1.13, 1.15; 717/168, 170, 173, 178
See application file for complete search history.

(56) References Cited

U.S. PATENT DOCUMENTS

| | | | |
|---|---|---|---|
| 8,505,004 B2 * | 8/2013 | Burke, Jr. ...................... | 717/173 |
| 2008/0244043 A1 * | 10/2008 | Kawai ............................ | 709/221 |
| 2011/0061048 A1 | 3/2011 | Katoh | |
| 2012/0026542 A1 * | 2/2012 | Kobayashi ................... | 358/1.15 |
| 2012/0206760 A1 * | 8/2012 | Asahara ....................... | 358/1.15 |

FOREIGN PATENT DOCUMENTS

| | | |
|---|---|---|
| JP | 2007-130838 A | 5/2007 |
| JP | 2011-61459 A | 3/2011 |

* cited by examiner

*Primary Examiner* — Benny Q Tieu
*Assistant Examiner* — Juan M Guillermety
(74) *Attorney, Agent, or Firm* — Carter, DeLuca, Farrell & Schmidt, LLP

(57) ABSTRACT

A contract management service receives a relocation request including rearrangement information relating to relocation of an application to be applied to the image forming apparatus, the relocation request being for demanding relocation of the application to be applied to the image forming apparatus, decides a rearrangement application corresponding to the image forming apparatus after being rearranged based on the rearrangement information, and responds with the image forming apparatus after being rearranged and rearrangement information relating to the rearrangement application. The image forming apparatus accepts an application rearrangement instruction having the rearrangement, determines whether or not applying the rearrangement application is required based on the rearrangement information, and receives the rearrangement application from the contract management service depending on a determination result to thereby apply the rearrangement application.

7 Claims, 24 Drawing Sheets

FIG. 5A

| Data type | Value |
|---|---|
| model code | 0x01 |
| firmware version | 00.01 |
| device identifier | 010001 |
| facsimile unit | not available |

FIG. 5B

| Data type | Value |
|---|---|
| model code | 0x01 |
| firmware version | 00.01 |
| device identifier | 010002 |
| facsimile unit | available |

FIG. 5C

| Data type | Value |
|---|---|
| model code | 0x02 |
| firmware version | 01.00 |
| device identifier | 020001 |
| facsimile unit | available |

FIG. 6A

| Tenant_ID | Device_ID | Status |
|---|---|---|
| A | AAA00001 | t |
| A | BBB00003 | t |
| B | | t |
| B | | t |
| C | | t |

FIG. 6B

| Device_ID | App_ID | App_Version |
|---|---|---|
| AAA00001 | App_A | 1.00 |
| AAA00001 | App_B | 1.00 |
| BBB00003 | App_C | 1.00 |

FIG. 7A

| App_ID | App_Ver | Device_Spec_ID |
|---|---|---|
| App_A | 1.00 | 001 |
| App_A | 1.01 | 001,002 |
| App_B | 1.00 | * |
| App_C | 1.00 | 001 |
| App_C | 1.01 | 001,002 |

FIG. 7B

| Device_Name | Device_ID | Device_Spec_ID |
|---|---|---|
| Dev_A | AAA* | 001 |
| Dev_B | BBB* | 001 |
| Dev_C | CCC* | 002 |

FIG. 8

| Device identifier | Tenant identifier | Virtual device configuration data | Virtual configuration data | Notification flag |
|---|---|---|---|---|
| 010001 | 100 | 1 | 1 | not-notified |
| 010002 | 100 | 2 | 2 | not-notified |
| 020001 | 100 | 3 | 3 | notified |
| 010010 | 200 | 4 | 4 | notified |

FIG. 9A

| Set value identifier | Default value | Value range | Condition |
|---|---|---|---|
| copy_settings.nup | 1in1 | 1 in 1, 2 in 1, 4 in 1 | none |
| device_settings.cloud_address | "http://ddd.com/config" | 256 bytes | none |
| device_settings.sleep_time | 10 minutes | 1 minute, 10 minutes, 1 hour | none |
| fax_settings.received_print | OFF | ON,OFF | facsimile unit |
| box_settings.server_address | "" | 256 bytes | none |

FIG. 9B

| Set value identifier | Default value | Value range | Condition |
|---|---|---|---|
| copy_settings.nup | 1in1 | 1 in 1, 2 in 1, 4 in 1 | none |
| device_settings.cloud_address | "http://ddd.com/config" | 256 bytes | none |
| device_settings.sleep_time | 10 seconds | 10 seconds, 1 minute, 10 minutes, 1 hour | none |
| fax_settings.received_print | OFF | ON,OFF | facsimile unit |

FIG. 10

| Set value identifier | Value |
|---|---|
| copy_settings.nup | 2 in 1 |
| device_settings.cloud_address | "http://ddd.com/config" |
| device_settings.sleep_time | 10 seconds |
| fax_settings.received_print | ON |
| box_settings.server_address | "http://192.168.1.1/server/" |

FIG. 14

```
(*TOP* (*PI* xml "version='1.0'")
(tenant
   (device
      (name "C5800")
      (id "AAA00001")
      (spec "001")
      (application
         (name "App_A")
         (version "1.0")
         (avail_spec "001"))
      (application
         (name "App_B")
         (version "1.0")
         (avail_spec "001,002")))
   (device
      (name "C4800")
      (id "BBB00003")
      (spec "001")
      (application
         (name "App_C")
         (version "1.0")
         (avail_spec "001")))))
```

FIG. 17

```
(*TOP* (*PI* xml "version='1.0'")
(tenant
  (device
    (name "C6400")
    (id "CCC00005")
    (spec "002")
    (application
      (name "App_A")
      (version "1.0")
      (avail_spec "001"))
    (application
      (name "App_B")
      (version "1.0")
      (avail_spec "001"))
    (application
      (name "App_C")
      (version "1.0")
      (avail_spec "001")))))
```

FIG. 18

```
(*TOP* (*PI* xml "version='1.0'")
(tenant
  (device
    (name "C6400")
    (id "CCC00005")
    (spec "002")
    (application
      (name "App_A")
      (version "1.01")
      (avail_spec "001,002")
      (ver_up "t"))
    (application
      (name "App_B")
      (version "1.0")
      (avail_spec "*")
      (ver_up "nil"))
    (application
      (name "App_C")
      (version "1.01")
      (avail_spec "001,002")
      (ver_up "t")))))
```

FIG. 26

```
(*TOP* (*PI* xml "version='1.0'")
(tenant
  (device
    (name "C6400")
    (id "CCC00005")
    (spec "002")
    (application
      (name "App_A")
      (version "1.01")
      (avail_spec "001,002")
      (ver_up "t")
      (status "t"))
    (application
      (name "App_B")
      (version "1.0")
      (avail_spec "*")
      (ver_up "nil")
      (status "t"))
    (application
      (name "App_C")
      (version "1.01")
      (avail_spec "001,002")
      (ver_up "t")
      (status "t")))))
```

FIG. 27A

| Tenant_ID | Device_ID | Status |
|---|---|---|
| A | CCC00005 | t |
| B | | t |
| B | | t |
| C | | t |

FIG. 27B

| Device_ID | App_ID | App_Ver |
|---|---|---|
| CCC00005 | App_A | 1.01 |
| CCC00005 | App_B | 1.00 |
| CCC00005 | App_C | 1.01 |

INFORMATION PROCESSING SYSTEM, MANAGEMENT METHOD, AND STORAGE MEDIUM FOR PLACING AN APPLICATION AFTER AN IMAGE FORMING APPARATUS HAS BEEN ARRANGED

BACKGROUND OF THE INVENTION

1. Field of the Invention

The present invention relates to an information processing system, a management method, and a storage medium.

2. Description of the Related Art

There has been proposed an image forming apparatus that stores configuration data in a storage unit. The configuration data is setting information (operation setting information) for switching the operation of the image forming apparatus. Since configuration data is stored in the storage unit provided in each of the image forming apparatuses, the setting changes in configuration data need to be made by the number of image forming apparatuses in order to change configuration data for all of the image forming apparatuses. For saving the time required for changing the settings of configuration data by the number of image forming apparatuses, there has been proposed a technology in which the settings of configuration data for a plurality of image forming apparatuses are made at one time by a certain information processing apparatus.

Japanese Patent Laid-Open No. 2007-130838 discloses an image forming system in which a plurality of image forming apparatuses, to which the initial setting operation has been performed, downloads initial system setting information from a server and reflects the downloaded initial system setting information in the initial setting content. This image forming system can redistribute the initial setting information from the server to the image forming apparatus even if the initial setting information is lost on the image forming apparatus Japanese Patent Laid-Open No. 2011-61459 discloses an installation method in which a plug-in feature that normally operates on a plurality of products by using an installation program that is executable irrespective of an execution environment can be provided in a common package even if the products are various types or the generation of the products changes.

An information processing system is assumed that comprises an image forming apparatus, and a distribution server that manages configuration data of the image forming apparatus and distributes applications that operate on the image forming apparatus. There is a case where replacement or addition (relocation) of a device is performed. Hereinafter, replacement or addition of the device is described as a rearrangement of the image forming apparatus. For example, rearrangement of the image forming apparatus such as the following (1) and (2) are assumed.

(1) A plurality of existing devices is gathered into newly one device.

(2) One or more new devices are added (relocated).

In the conventional information processing system, optimal placement of the applications according to the image forming apparatus after being rearranged may not be realized when the plurality of existing devices is gathered into newly one device indicated in the aforementioned (1), or when one or more new devices are added in the aforementioned (2). Specifically, in the conventional information processing system, upon rearrangement of the image forming apparatus, a secure transfer of the applications is not ensured while preventing a copy of the applications by an unauthorized person. Also, in the conventional information processing system, a version upgrade of the applications may not be performed depending on performance of the image forming apparatus after being rearranged.

SUMMARY OF THE INVENTION

An information processing system of the present invention optimally locates an application depending on an image forming apparatus after being rearranged when the image forming apparatus of which configuration date is managed by the management apparatus on a network is rearranged.

An information processing system of an embodiment of the present invention includes an image forming apparatus; and a management apparatus that manages the image forming apparatus. The management apparatus includes a managing unit configured to manage operation setting information for switching an operation of the image forming apparatus and transmit, to the image forming apparatus, the operation setting information corresponding to the image forming apparatus in response to an acquisition request for the operation setting information from the image forming apparatus; and an application managing unit configured to manage an application to be applied to the image forming apparatus. The image forming apparatus includes a requesting unit configured to transmit the acquisition request for the operation setting information to the management apparatus, and acquire the operation setting information from the management apparatus as a response to the acquisition request; and an application managing unit configured to manage the application to be applied to the image forming apparatus. The application managing unit provided in the management apparatus includes a receiving unit configured to receive an relocation request including relocation information relating to relocation of the application to be applied to the image forming apparatus, the relocation request being required as a result of the rearrangement of the image forming apparatus; a transmitting unit configured to decide an application corresponding to the image forming apparatus after being rearranged as a rearrangement application based on the relocation information included in the relocation request, and transmit rearrangement information relating to the image forming apparatus after being rearranged and the rearrangement application to the user device; a distributing unit configured to distribute the rearrangement application to the image forming apparatus after being rearranged upon request of the image forming apparatus after being relocated. The application managing unit provided in the image forming apparatus includes an accepting unit configured to accept an application rearranging instruction to be applied that includes the rearrangement information and for applying from the user device; a determining unit configured to determine whether or not applying the rearrangement application to the image forming apparatus is required based on the rearrangement information included in the application rearranging instruction; an acquiring unit configured to request a distribution of a rearrangement application to the management apparatus when it is determined that applying of the rearrangement application to the image forming apparatus is required, and acquire the rearrangement application from the management apparatus; and an applying unit configured to apply the acquired rearrangement application.

According to the information processing system of the present invention, applications are optimally located depending on an image forming apparatus after being rearranged when the image forming apparatus of which configuration date is managed by the management apparatus on the network is rearranged. Specifically, applications or licenses that have been applied to the image forming apparatus before being relocated are optimally relocated depending on the number or a model of the image forming apparatus after being relocated.

Further features of the present invention will become apparent from the following description of exemplary embodiments with reference to the attached drawings.

BRIEF DESCRIPTION OF THE DRAWINGS

FIGS. 5A to 5C illustrate examples of actual device configuration data.

FIG. 6A illustrates an example of tenant specific device information.

FIG. 6B illustrates an example of device-specific application information.

FIG. 7A illustrates an example of specification information compatible with an application.

FIG. 7B illustrates an example of device-specification information.

FIG. 8 illustrates an example of the virtual device.

FIGS. 9A and 9B illustrate exemplary model-specific set value schemas.

FIG. 10 illustrates an example of tenant configuration data.

FIG. 14 is an example of application configuration information.

FIG. 17 is an example of an application relocation request.

FIG. 18 is an example of application rearrangement decided information.

FIG. 26 is an example of application rearrangement decided information.

FIGS. 27A and 27B are examples of tenant specific device information.

DESCRIPTION OF THE EMBODIMENTS

Hereinafter, a description will be given of the information processing system of the present embodiment. Firstly, the terms used in the present embodiment are defined. The term "configuration data" refers to data (operation setting information) for switching the operation of an image forming apparatus. For example, configuration data corresponds to a default value for the imposition of a copy job or the like. If the default value for imposition of a copy job is set to "1 in 1", one page is printed on a single sheet of paper as a result of copying. If the default value for imposition of a copy job is set to "2 in 1", two pages are printed on a single sheet of paper as a result of copying.

The term "device configuration data" refers to data indicating the configuration of a device provided in an image forming apparatus. For example, device configuration data indicates whether or not an image forming apparatus includes a facsimile unit. Examples of device configuration data include a model code for uniquely identifying the model of an image forming apparatus, a running firmware version, and the like.

The term "model-specific set value schema" refers to data for defining the schema of configuration data that is held by a specific model of an image forming apparatus. The term "schema" refers to data for defining the convention and positioning for configuration data. Examples of such a model-specific set value schema include a condition(s) for validating the set value identifier for each configuration data, the default value, the value range, and data. In the present embodiment, it is assumed that there is a difference between configuration data to be held depending on the model of an image forming apparatus and a set value schema is prepared for different models of an image forming apparatus.

Figure 1:
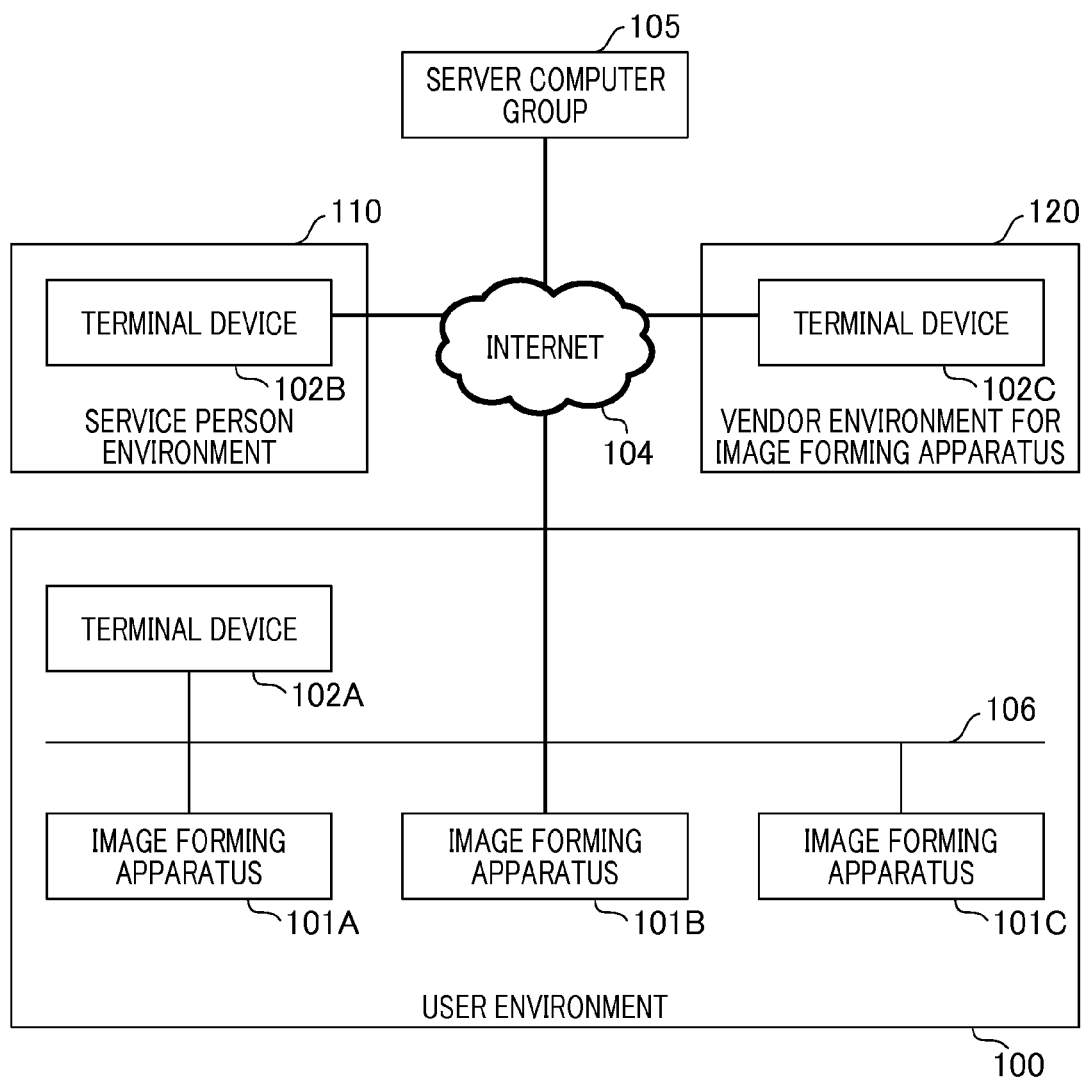
FIG. 1 is a diagram illustrating an exemplary general configuration of the present embodiment.

The term "virtual device" refers to a data group of actual devices held by a server computer group. More specifically, a virtual device includes at least device configuration data and configuration data. The term "tenant" refers to a unit of consignor to whom a user consigns the management of an image forming apparatus. The term "tenant identifier" refers to an identifier for uniquely identifying a tenant. For example, assume the case where management of image forming apparatuses 101A, 101B, and 101C in a user environment 100 (to be described below) shown in FIG. 1 is consigned by a certain company. In this case, a corresponding tenant identifier is assigned to the user environment 100 and the image forming apparatuses 101A, 101B, and 101C are recognized and managed as the image forming apparatuses belonging to the tenant.

The definition is given as follows so as to distinguish among data included in a virtual device, data held by an actual device, and data dedicated for a tenant. Device configuration data included in a virtual device is referred to as "virtual device configuration data" and configuration data included in a virtual device is referred to as "virtual configuration data". Device configuration data held by an actual device is referred to as "actual device configuration data" and configuration data held by an actual device is referred to as "actual configuration data". Configuration data that is commonly used in the tenant is referred to as "tenant configuration data".

FIG. 1 is a diagram illustrating an exemplary general configuration of the present embodiment. The system shown in FIG. 1 includes a user environment 100, a server computer group 105, a service person environment 110, and a vendor environment 120 for image forming apparatuses. The user environment 100, the server computer group 105, the service person environment 110, and the vendor environment 120 for image forming apparatuses communicate with each other via Internet 104. The Internet 104 is a network that is capable of providing digital communication on a public line.

The user environment 100 is an environment where a user of an image forming apparatus executes the operation of the image forming apparatus. The user environment 100 includes image forming apparatuses 101A, 101B, and 101C and a terminal apparatus 102A. The image forming apparatuses 101A, 101B, and 101C are the image forming apparatuses of the present embodiment. A network 106 is a network that is capable of providing digital communication in the user environment 100. The image forming apparatuses 101A, 101B, and 101C can access the Internet 104 via the network 106. The terminal apparatus 102A is a computer that is operable by a user of the user environment 100. The terminal apparatus 102A can also access the Internet 104 via the network 106.

The server computer group 105 is a server group that provides a service via the Internet 104. In the present embodiment, the server computer group 105 functions as a management apparatus that manages configuration data provided for image forming apparatuses. The server computer group 105 manages the image forming apparatuses by associating them with tenants, each of which is a preset management unit. The server computer group 105 also functions as a management apparatus that manages contract information about a contract of the image forming apparatuses. It should be noted that a management method of the present embodiment is realized by functions of the management apparatus of the present embodiment. Computer programs of the present embodiment cause a computer to execute the management method.

The service person environment 110 is an environment where a service person manages an image forming apparatus using the terminal apparatus 102B. The service person environment 110 includes a terminal apparatus 102B. The terminal apparatus 102B is a computer that is operated by a service person who manages the image forming apparatuses 101A, 101B, and 101C. The terminal apparatus 102B can access the Internet 104.

The vendor environment 120 for image forming apparatuses is an environment where management personnel of a vendor for producing an image forming apparatus performs the maintenance of data that is required for the management of an image forming apparatus. The vendor environment 120 for image forming apparatuses includes a terminal apparatus 102C. The terminal apparatus 102C is a computer that is operated by management personnel of a vendor for producing an image forming apparatus. The terminal apparatus 102C can access the Internet 104. In the following description, the image forming apparatuses 101A, 101B, and 101C are also described as the image forming apparatus 101 and the terminal apparatuses 102B and 102C are also described as the terminal apparatus 102.

Figure 2:
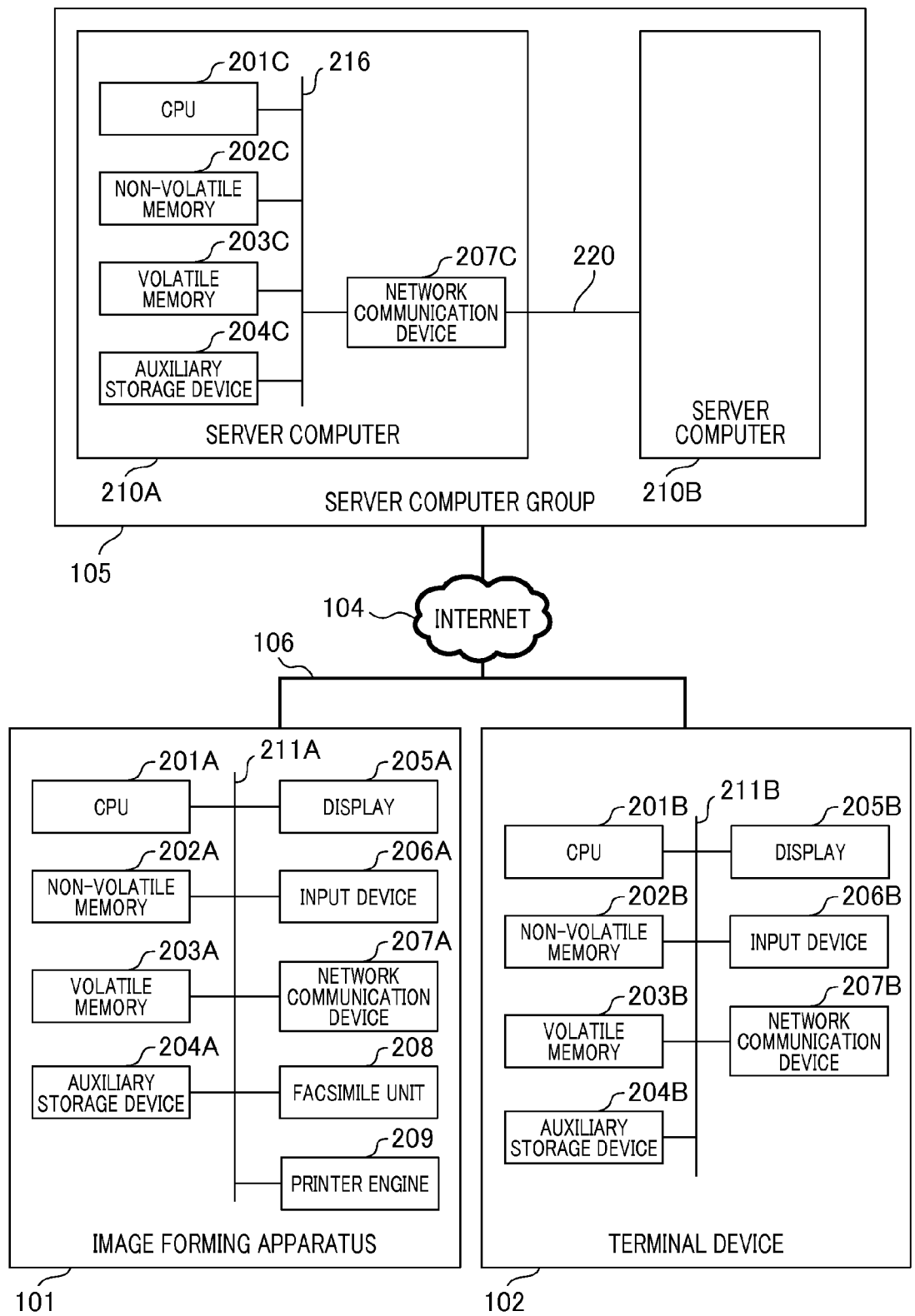
FIG. 2 illustrates an example of the hardware configuration of an information processing system.

FIG. 2 is a diagram illustrating an example of the hardware configuration of the information processing system of the present embodiment. The server computer group 105 includes a server computer 210A and a server computer 210B. The server computer 210B has the same configuration as that of the server computer 210A. The server computer 210A and the server computer 210B communicate with each other via a network 220.

The server computer 210A includes a CPU 201C, a non-volatile memory 202C, a volatile memory 203C, an auxiliary storage device 204C, and a network communication device 207C that are connected to an internal bus 216. The image forming apparatus 101 includes a CPU 201A, a non-volatile memory 202A, a volatile memory 203A, an auxiliary storage device 204A, a display 205A, an input device 206A, a network communication device 207A, a facsimile unit 208, and a printer engine 209 that are connected to an internal bus 211A. The terminal apparatus 102 includes a CPU 201B, a non-volatile memory 202B, a volatile memory 203B, an auxiliary storage device 204B, a display 205B, an input device 206B, and a network communication device 207B that are connected to an internal bus 211B.

In the following description, the CPU 201A, 201B, and 201C are also described as a CPU 201, the non-volatile memories 202A, 202B, and 202C are also described as a non-volatile memory 202, the volatile memories 203A, 203B, and 203C are also described as a volatile memory 203, the auxiliary storage devices 204A, 204B, and 204C are also described as an auxiliary storage device 204, the displays 205A and 205B are also described as a display 205, the input devices 206A and 206B are also described as an input device 206, the network communication devices 207A and 207B are also described as a network communication device 207, and the internal buses 211A and 211B are also described as an internal bus 211.

The CPU (Central Processing Unit) 201 executes programs and controls various types of processing. The non-volatile memory 202 includes a ROM (Read Only Memory). The non-volatile memory 202 stores programs and data that are required for device start processing at the initial stage. The volatile memory 203 includes a RAM (Random Access Memory). The volatile memory 203 is used as a temporary storage location of the programs and data.

The auxiliary storage device 204 is a large-capacity storage device such as a hard disk, a RAM drive, or the like. The auxiliary storage device 204 stores large-capacity data and holds the execution code of the programs. The auxiliary storage device 204 stores data that needs to be held for a longer time than that of the volatile memory 203. The display 205 performs information display processing and notifies a user person of the resulting information. In the present embodiment, a user denotes a user person and a service person.

The input device 206 accepts a user person's selection instruction and transmits the instruction to a program via the internal bus 211. The network communication device 207 is a device that communicates with an external device via a network. The facsimile unit 208 is a hardware unit that transmits the image data formed by the image forming apparatus 101 or the image data stored in the auxiliary storage device 204A to an external device via the network 106. The facsimile unit 208 is optional and the image forming apparatus 101 may not include the facsimile unit 208. The printer engine 209 prints the image data formed by the image forming apparatus 101 or the image data stored in the auxiliary storage device 204A on a recording medium such as paper.

Figure 3:
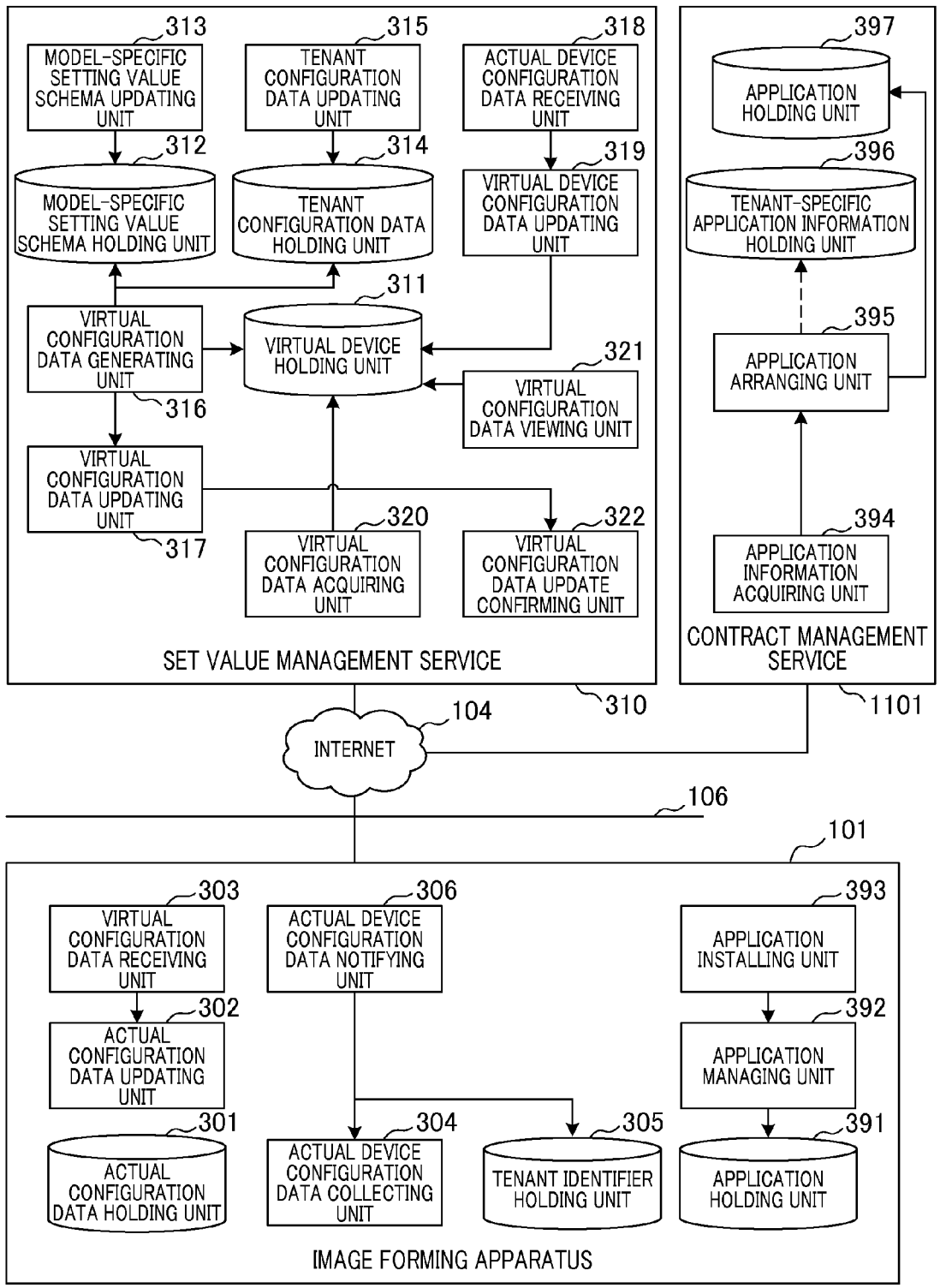
FIG. 3 is an exemplary functional block diagram illustrating the information processing system.

FIG. 3 is an exemplary functional block diagram illustrating the information processing system of the present embodiment. The information processing system shown in FIG. 3 includes an image forming apparatus 101, a set value management service 310, and a contract management service 1101. The image forming apparatus 101, the set value management service 310, and the contract management service 1101 communicate with each other via the Internet 104. The set value management service 310 and the contract management service 1101 function as a management apparatus of the present embodiment. Also, an information processing method and computer programs of the present embodiment are realized by functions of the information processing system shown in FIG. 3.

The image forming apparatus 101 includes an actual configuration data holding unit 301, an actual configuration data updating unit 302, a virtual configuration data receiving unit 303, an actual device configuration data collecting unit 304, a tenant identifier holding unit 305, and an actual device configuration data notifying unit 306. The image forming apparatus 101 also includes an application holding unit 391, an application managing unit 392, and an application installing unit 393.

The actual configuration data holding unit 301 holds configuration data for an image forming apparatus. More specifically, the actual configuration data holding unit 301 stores configuration data in the auxiliary storage device 204A for management. The image forming apparatus 101 switches operational behavior based on actual configuration data held by the actual configuration data holding unit 301.

The actual configuration data updating unit 302 updates actual configuration data held by the actual configuration data holding unit 301. More specifically, the actual configuration data updating unit 302 updates actual configuration data by replacing it with virtual configuration data acquired by the virtual configuration data receiving unit 303.

The virtual configuration data receiving unit 303 makes an acquisition request for virtual configuration data to the virtual configuration data acquiring unit 320 provided in the set value management service 310. Then the virtual configuration data receiving unit 303 receives virtual configuration data acquired by the virtual configuration data acquiring unit 320 from the virtual configuration data acquiring unit 320. The virtual configuration data receiving unit 303 calls the virtual configuration data acquiring unit 320 by use of an address set in actual configuration data held by the actual configuration data holding unit 301.

Figure 4A:
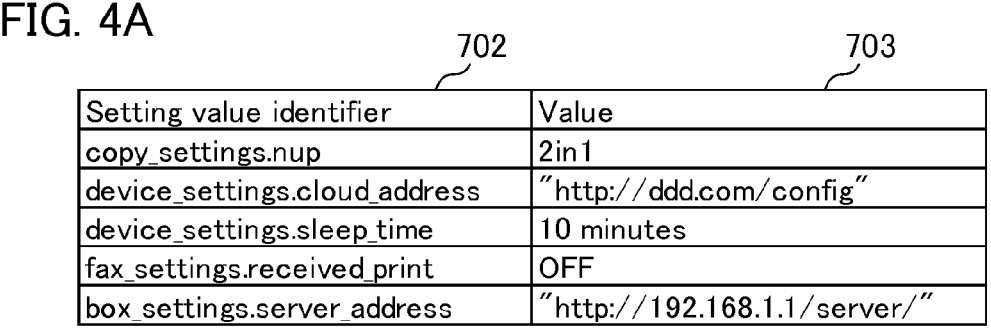
FIGS. 4A to 4C illustrate examples of actual configuration data.
Figure 4B:
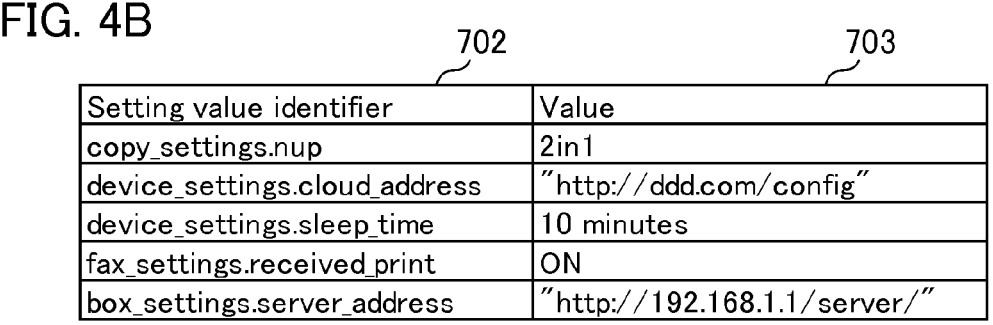
Figure 4C:
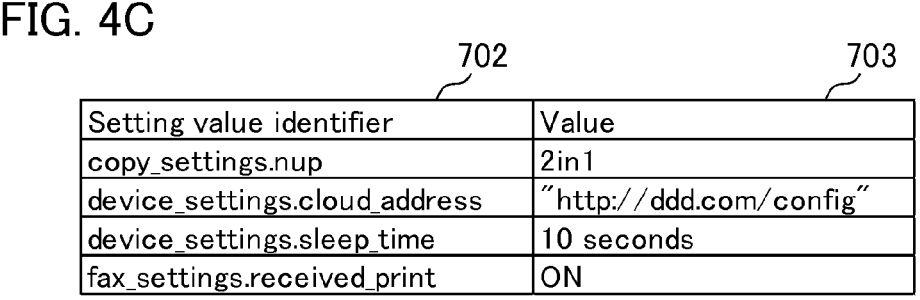

FIGS. 4A to 4C are diagrams illustrating an example of actual configuration data. FIG. 4A shows actual configuration data for an image forming apparatus of which the device identifier is "010001". FIG. 4B shows actual configuration data for an image forming apparatus of which the device identifier is "010002". FIG. 4C shows actual configuration data for an image forming apparatus of which the device identifier is "020001". The device identifier is identification information for uniquely identifying the image forming apparatus.

Actual configuration data includes data items such as a set value identifier and a value. The set value identifier 702 is an identifier that uniquely identifies the set value included in configuration data. The value indicates the set value.

In the example shown in FIG. 4A, http://ddd.com/config is set as a value (address) of "device_settings.cloud_address". This is an address of the set value management service that distributes configuration data to the image forming apparatus 101. Thus, the virtual configuration data receiving unit 303 accesses this address. The virtual configuration data has the same data configuration with the actual configuration data shown in FIG. 4. Hence, the actual configuration data shown in FIGS. 4A to 4C are arbitrarily utilized for description as the virtual configuration data.

Referring back to FIG. 3, the actual device configuration data collecting unit 304 collects device configuration data (actual device configuration data) of the image forming apparatus 101.

FIGS. 5A to 5C are diagrams illustrating an example of actual device configuration data. Each of FIGS. 5A, 5B, and 5C shows actual device configuration data for a different image forming apparatus. Actual device configuration data has data items including a data type 602 and a value 603. The data type 602 is the type of data included in actual device configuration data. A model code for identifying the model of an image forming apparatus, a firmware version, a device identifier for identifying a device, and the like are set to the data type 602. The value 603 is the value of data. A value (e.g., the value of a device identifier, the presence/absence of a facsimile unit, or the like) corresponding to the data type is set to the value 603. Note that virtual device configuration data has the same data configuration as the actual device configuration data. Hence, the actual device configuration data shown in FIGS. 5A to 5C is arbitrarily utilized for description as virtual configuration data.

The tenant identifier holding unit 305 holds a tenant identifier that is the identifier of a tenant to which the image forming apparatus 101 belongs. The tenant identifier is set upon initial installation of the image forming apparatus 101 and is stored in the auxiliary storage device 204A so as not to be lost even when the power is OFF.

The actual device configuration data notifying unit 306 notifies the actual device configuration data receiving unit 318 of the set value management service 310 of the actual device configuration data collected by the actual device configuration data collecting unit 304 and the tenant identifier held by the tenant identifier holding unit 305. More specifically, the actual device configuration data notifying unit 306 transmits a configuration data generation request, which includes the actual device configuration data and the tenant identifier, to the actual device configuration data receiving unit 318. The configuration data generation request is a request (operation setting generation request) for generating virtual configuration data corresponding to the image forming apparatus 101.

The application holding unit 391 holds one or more applications that operate on the image forming apparatus 101. The application held by the application holding unit 391 is, for example, the application installed on the image forming apparatus 101 via the network 106. In the present embodiment, the application installing unit 393 holds licenses, and downloads the application that is executable on the image forming apparatus 101 from the contract management service 1101 via Internet 104. Then, the application holding unit 391 holds the downloaded application.

The application managing unit 392 is a software framework that manages a life cycle of the application. Specifically, the application managing unit 392 manages the life cycle (activation, halt, upgrade, installation, or uninstallation) of the application installed from the external device.

Also, the application managing unit 392 acquires all application related information in the image forming apparatus 101 and information of the image forming apparatus 101 from the image forming apparatus 101, and returns them to the application information acquiring unit 394 of the contract management service 1101. For example, the application related information indicates an application name, an application version, and a list of the device specification ID that can be installed with respect to all applications in the image forming apparatus 101. Also, information of the image forming apparatus 101 indicates, for example, a device name, an ID, and device specification information of the image forming apparatus.

The application installing unit 393 installs the application from the external device. The application installing unit 393 validates the license corresponding to the application when installing the application for the image forming apparatus 101.

The contract management service 1101 manages contract information, which is information relating to a contract of the image forming apparatus 101. In the present embodiment, the contract management service 1101 manages the application corresponding to the image forming apparatus 101. The contract management service 1101 may manage the license of the application, and manage any contract information other than the license (such as life cycle information of the image forming apparatus).

The contract management service 1101 includes an application information acquiring unit 394, an application arranging unit 395, a tenant-specific application information holding unit 396, and an application holding unit 397.

The application information acquiring unit 394 acquires all application related information and information of the image forming apparatus 101 in the image forming apparatus 101 from the image forming apparatus 101. The application information acquiring unit 394 acquires the application related information and the information of the image forming apparatus 101 via Internet 104 or the network 106.

The application arranging unit 395 functions as a receiving unit that receives, from the terminal device 102 that is a user device, an application relocation request that is a request for relocation of the application that is required as a result of the rearrangement of the image forming apparatus and that is applied to the image forming apparatus. The application relocation request is a request for relocation of the application applied to the image forming apparatus. For example, the terminal device 102 transmits the request for relocation of the application to the application arranging unit 395 when rearrangement of the image forming apparatus is needed. The application relocation request includes application arrangement change information of the image forming apparatus 101 after being rearranged in a certain tenant. The application arrangement change information is information relating to relocation of the application applied to the image forming apparatus (relocation information).

The application arranging unit 395 compares application arrangement change information with application information of the image forming apparatus before being rearranged that corresponds to the tenant held by the tenant-specific application information holding unit 396. Then, the application arranging unit 395 rearranges the application information held by the tenant-specific application information holding unit 396 based on this comparison result.

In the present embodiment, it is assumed that three applications decentrally located in two image forming apparatuses in a certain tenant are collectively relocated in one image forming apparatus that is newly introduced. Specifically, the image forming apparatus before being rearranged indicates the image forming apparatus of which the device identifier is "AAA00001" and the image forming apparatus of which the device identifier is "BBB00003". The image forming apparatus after being rearranged is the image forming apparatus of which the device identifier is "CCC00005".

Rearrangement of the image forming apparatus in which the present invention is employed is not limited to the aforementioned example. For example, the image forming apparatus before being rearranged may be two image forming apparatuses A and B, while the image forming apparatus after being relocated may be three image forming apparatus A, B and C. The applications A and B may be applied to the image forming apparatus A before being rearranged, while the application C may be applied to the image forming apparatus B before being rearranged. Also, the application A may be applied to the image forming A apparatus after being rearranged, the application B may be applied to the image forming apparatus B after being rearranged, and the application C may be applied to the image forming apparatus C after being rearranged.

The tenant-specific application information holding unit 396 holds tenant-specific application information. The tenant-specific application information is information relating to the image forming apparatus 101 that belongs to each tenant managed by the contract management service 1101 and the application installed on the image forming apparatus 101. The tenant-specific application information includes tenant specific device information, device-specific application information, specification information compatible with the application, and device specification information.

FIGS. 6A and 6B are diagrams illustrating examples of tenant specific device information and device-specific application information. FIG. 6A indicates tenant specific device information. The tenant specific device information includes data items such as a tenant identifier (Tenant_ID) 1101, a device identifier (Device_ID) 1102, and an operation status (Status) 1103.

The tenant identifier 1101 indicates identification information for uniquely identifying the tenant. The device identifier 1102 indicates identification information for uniquely identifying the image forming apparatus that belongs to the tenant. The operation status 1103 indicates the operation status of that the image forming apparatus.

FIG. 6B indicates device-specific application information. The device specific information includes data items such as a device identifier (Device_ID) 1104, an application identifier (App_ID) 1105, and an application version (App_Version) 1106.

The device identifier 1104 is the same as the device identifier 1102 shown in FIG. 6A. The application identifier 1105 indicates an application installed on the image forming apparatus corresponding to the device identifier 1104. The application version 1106 is the version number of the application.

FIGS. 7A and 7B are diagrams illustrating an example of specification information compatible with an application and device specification information. FIG. 7A indicates specification information compatible with the application. The specification information compatible with the application includes data items such as an application identifier (App_ID) 1401, an application version (App_Version) 1402, and a device specification identifier (Device_Spec_ID) 1403.

The application identifier 1401 is the same as the application identifier 1105 shown in FIG. 6B. The application version 1402 is the same as the application identifier 1105 shown in FIG. 6B. The device specification identifier is identification information for uniquely identifying the device specification. The device specification indicates an operation environment for the application corresponding to the application identifier 1401. The device specification is defined depending on a model of the image forming apparatus. Thus, the device specification functions as an operational condition of the application provided in the image forming apparatus. In other words, specification information compatible with an application functions as operational condition information relating to the application operational condition of the image forming apparatus that is stored in a storage unit in advance.

FIG. 7B indicates device specification information. The device specification information includes data items such as a model name (Device_Name) 1404, a device identifier (Device_ID) 1405, and a device specification identifier (Device_Spec_ID) 1406. The model name 1404 is a model name of the image forming apparatus. The device identifier 1405 is the same as the device identifier 1102 shown in FIG. 6A. The device specification identifier 1406 is the same as the device specification identifier 1403 shown in FIG. 7A.

Referring back to FIG. 3, the application holding unit 397 manages all types and all versions of applications operable on the image forming apparatus 101 managed by the contract management service 1101. In other words, the application arranging unit 395, the tenant-specific application information holding unit 396, and the application holding unit 397 functions as an application management unit that manages the application applied to the image forming apparatus.

The set value management service 310 functions as a management apparatus that manages configuration data of the image forming apparatus. The set value management service 310 is provided on the server computer group 105.

The set value management service 310 includes a virtual device holding unit 311, a model-specific set value schema holding unit 312, a model-specific set value schema updating unit 313, a tenant configuration data holding unit 314, and a tenant configuration data updating unit 315. Also, the set value management service 310 includes a virtual configuration data generating unit 316, a virtual configuration data updating unit 317, an actual device configuration data receiving unit 318, a virtual device configuration data updating unit 319, and a virtual configuration data acquiring unit 320. Further, the set value management service 310 includes a virtual configuration data viewing unit 321, and a virtual configuration data update confirming unit 322.

The virtual device holding unit 311 holds a virtual device. The virtual device includes at least virtual device configuration data, virtual configuration data, a device identifier of the virtual device, and a tenant identifier. The virtual device holding unit 311 stores the virtual device in the auxiliary storage device 204C for management.

FIG. 8 is a diagram illustrating an exemplary virtual device. The virtual device shown in FIG. 8 has a device identifier 802, a tenant identifier 803, a virtual device configuration data 804, a virtual configuration data 805, and a notification flag 806. The device identifier 802 is identification information for uniquely identifying a virtual device. The device identifier 802 corresponds to identification information for uniquely identifying the image forming apparatus 101 corresponding to the virtual device. The device identifier 802 is included in device configuration data which is notified by the image forming apparatus 101 to the set value management service 310.

The tenant identifier 803 is identification information for uniquely identifying a tenant to which the image forming apparatus 101 corresponding to the virtual device belongs. The virtual device configuration data 804 is identification information for uniquely identifying virtual device configuration data. Virtual device configuration data corresponds to device configuration data (actual device configuration data) of the image forming apparatus 101 corresponding to the virtual device. The virtual configuration data 805 is identification information for uniquely identifying virtual configuration data. Virtual configuration data corresponds to configuration data (actual configuration data) of the image forming apparatus 101 corresponding to the virtual device.

The notification flag 806 indicates whether or not the image forming apparatus has already been notified about the virtual configuration data 805. The flag "not-notified" set in the notification flag 806 indicates that the image forming apparatus has not been notified about the virtual configuration data 805. The flag "notified" set in the notification flag 806 indicates that the image forming apparatus has already been notified about the virtual configuration data 805.

When virtual configuration data is updated, the virtual configuration data acquiring unit 320 acquires the virtual configuration data and notifies the image forming apparatus 101. Thus, when the virtual configuration data updating unit 317 updates virtual configuration data, the virtual configuration data updating unit 317 sets the notification flag 806 to "not-notified". When the virtual configuration data acquiring unit 320 acquires, for example, virtual configuration data, the virtual configuration data acquiring unit 320 sets the notification flag 806 corresponding to the virtual configuration data to "notified".

Referring back to FIG. 3, the model-specific set value schema holding unit 312 holds the model-specific set value schema. One model-specific set value schema is prepared corresponding to each model of image forming apparatuses.

FIGS. 9A and 9B are diagrams illustrating an exemplary model-specific set value schema. FIG. 9A shows a model-specific set value schema corresponding to the model code of 0x01. FIG. 9B shows a model-specific set value schema corresponding to the model code of 0x02. The model-specific set value schema has data items including a set value identifier 402, a default value 403, a value range 404, and a condition 405.

The set value identifier 402 is identification information for uniquely identifying a setting item. For example, the set value identifier "copy_settings.nup" indicates a setting item relating to imposition in copy settings. If the set value identifiers 402 are identical, this indicates the fact that the setting items are identical in spite of different models. The default value 403 is a default set value for the model. The value range 404 is a definition of a range which can be set in the model. For example, the value range 404 of the set value identifier "copy_settings.nup" indicates that the value range can be selected from three types of copy settings "1 in 1, 2 in 1, and 4 in 1" in the model.

The condition 405 is a definition of the conditions necessary for using set values in the model. The condition "facsimile unit" is set in the condition 405 corresponding to the setting item of "fax_settings.received_print". Thus, the set value for the setting item becomes valid only when mounting of a facsimile unit is confirmed.

Referring back to FIG. 3, the model-specific set value schema updating unit 313 updates the model-specific set value schema held by the model-specific set value schema holding unit 312. For example, when a vendor of the image forming apparatus releases a new model, a model-specific set value schema corresponding to the new model is registered in accordance with the instruction given by the administrator of the vendor. If any setting item is changed, the model-specific set value schema updating unit 313 updates the model-specific set value schema.

The tenant configuration data holding unit 314 holds configuration data that a tenant would like to set to an image forming apparatus.

FIG. 10 is a diagram illustrating an example of tenant configuration data. Tenant configuration data has data items including a set value identifier 502, a value 503, and the like. The set value identifier 502 is the same as the set value identifier 402 included in the model-specific set value schema shown in FIGS. 9A and 9B. The value 503 is a value of a common setting desired by a tenant. The copy setting "2 in 1" is set in the set value identifier "copy_settings.nup". This indicates that the user desires that the copy setting "2 in 1" be set in all image forming apparatuses held by a tenant.

Referring back to FIG. 3, the tenant configuration data updating unit 315 updates tenant configuration data held by the tenant configuration data holding unit 314. In accordance with the operation by a service person who manages image forming apparatuses held by a tenant, the terminal apparatus 102B in the service person environment 110 provides an update instruction for tenant configuration data. The tenant configuration data updating unit 315 updates tenant configuration data in accordance with the update instruction. The service person performs an operation on a setting screen of tenant configuration data, which is displayed on a web browser running on the terminal apparatus 102B. A service person performs an operation on a setting screen displayed on the web browser running in the terminal device 102B.

The virtual configuration data generating unit 316 generates virtual configuration data based on the model-specific set value schema, tenant configuration data, and virtual device configuration data. Firstly, the virtual configuration data generating unit 316 acquires virtual device configuration data shown in FIG. 5A from the virtual device holding unit 311.

Next, the virtual configuration data generating unit 316 refers to a model code included in the acquired virtual device configuration data to thereby specify the model of the image forming apparatus. Using the virtual device configuration data shown in FIG. 5A as an example, 0x01 is set as a value corresponding to the model code. Thus, the virtual configuration data generating unit 316 specifies the model of the image forming apparatus having the model code of 0x01.

Next, the virtual configuration data generating unit 316 acquires a model-specific set value schema corresponding to the specified model code from the model-specific set value schema holding unit 312. The virtual configuration data generating unit 316 acquires, for example, the model-specific set value schema shown in FIG. 9A, of which the model code matches 0x01.

Next, the virtual configuration data generating unit 316 generates virtual configuration data based on the set values defined in the acquired model-specific set value schema. Using the model-specific set value schema shown in FIG. 9A as an example, the virtual configuration data generating unit 316 generates virtual configuration data based on set values corresponding to five setting items "copy_settings.nup", "device_settings.cloud_address", "device_settings.sleep_time", "fax_settings.received_print", and "box_settings.server_address".

Next, the virtual configuration data generating unit 316 acquires tenant configuration data shown in FIG. 10 from the tenant configuration data holding unit 314. The virtual configuration data generating unit 316 determines whether or not the set value included in tenant configuration data falls within the value range defined in the model-specific set value schema.

A description will be given by taking an example of tenant configuration data shown in FIG. 10 and model-specific set value schema shown in FIG. 9A. The value (set value) for the setting item "copy_settings.nup" included in tenant configuration data is "2 in 1". In contrast, the value range corresponding to the setting item, which is defined in the model-specific set value schema, is "1 in 1, 2 in 1, and 4 in 1". Thus, the set value included in tenant configuration data falls within the value range defined in the model-specific set value schema.

The value (set value) for the setting item "device_settings.sleep_time" included in tenant configuration data is "10 seconds". On the other hand, the value range corresponding to the setting item, which is defined in the model-specific set value schema, is "1 minute, 10 minutes, and 1 hour". Thus, the set value included in tenant configuration data does not fall within the value range defined in the model-specific set value schema.

When the set value included in tenant configuration data does not fall within the value range defined in the model-specific set value schema, the virtual configuration data generating unit 316 acquires the default value defined in the model-specific set value schema. In this example, the default value "10 minutes" is acquired. The virtual configuration data generating unit 316 uses the acquired default value as the set value for the setting item in virtual configuration data.

When the set value included in tenant configuration data falls within the value range defined in the model-specific set value schema, the virtual configuration data generating unit 316 takes the set value included in tenant configuration data as the set value corresponding to the setting item of virtual configuration data.

Next, the virtual configuration data generating unit 316 determines whether or not virtual device configuration data satisfies the condition defined in the model-specific set value schema. Referring to the model-specific set value schema shown in FIG. 9A, there is no particular condition corresponding to "copy_settings.nup". Thus, virtual device configuration data shown in FIG. 5A satisfies the condition corresponding to "copy_settings.nup".

However, the condition corresponding to "fax_settings.received_print" is "facsimile unit", whereas the value "none" is set as a value for "facsimile unit" included in device configuration data. Thus, virtual device configuration data does not satisfy the condition corresponding to the setting item.

When virtual device configuration data does not satisfy the condition defined in the model-specific set value schema, the virtual configuration data generating unit 316 acquires the default value 403 defined in the model-specific set value schema. In this example, the virtual configuration data generating unit 316 acquires a default value "OFF" corresponding to "fax_settings.received_print". The virtual configuration data generating unit 316 uses the acquired default value as the set value for the setting item in virtual configuration data.

Referring back to FIG. 3, the virtual configuration data updating unit 317 updates virtual configuration data in the virtual device held by the virtual device holding unit 311 with virtual configuration data generated by the virtual configuration data generating unit 316.

More specifically, among the virtual devices held by the virtual device holding unit 311, the virtual configuration data updating unit 317 acquires a virtual device having a device identifier corresponding to the generated virtual configuration data. Then, the virtual configuration data updating unit 317 updates virtual configuration data included in the acquired virtual device by replacing it with the generated virtual configuration data. When the notification flag 806 for the virtual device is "notified", the virtual configuration data updating unit 317 further sets the notification flag 806 to "not-notified". Setting the notification flag 806 to "not-notified" means that virtual configuration data corresponding to an image forming apparatus is changed and thus the image forming apparatus needs to refer to new virtual configuration data.

The actual device configuration data receiving unit 318 receives device configuration data (FIGS. 5A to 5C) and a tenant identifier from the actual device configuration data notifying unit 306 provided in the image forming apparatus 101. The virtual device configuration data updating unit 319 updates virtual device configuration data retained by the virtual device held by the virtual device holding unit 311 with device configuration data received by the actual device configuration data receiving unit 318. More specifically, among the virtual devices held by the virtual device holding unit 311, the virtual device configuration data updating unit 319 acquires a virtual device having a device identifier that is set in device configuration data received by the actual device configuration data receiving unit 318. Then, the virtual device configuration data updating unit 319 updates virtual device configuration data retained by the acquired virtual device with device configuration data received by the actual device configuration data receiving unit 318.

The virtual configuration data acquiring unit 320 receives a virtual configuration data acquisition request from the virtual configuration data receiving unit 303 provided in the image forming apparatus 101 via the Internet 104 to thereby acquire virtual configuration data from the virtual device holding unit 311.

The virtual configuration data acquisition request includes at least a device identifier for specifying a virtual device. Thus, the virtual configuration data acquiring unit 320 searches for a virtual device having a device identifier included in the virtual configuration data acquisition request. The virtual configuration data acquiring unit 320 acquires virtual configuration data retained by the searched virtual device. Then, the virtual configuration data acquiring unit 320 passes the acquired virtual configuration data to the request source, i.e., the virtual configuration data receiving unit 303 via the Internet 104.

The virtual configuration data viewing unit 321 receives a configuration data viewing request from an external device via the Internet 104. The configuration data viewing request is a request on an HTTP protocol. The virtual configuration data viewing unit 321 acquires virtual configuration data corresponding to the viewing request and generates a HTML page for viewing for the acquired virtual configuration data and returns the HTML page for viewing to the request source.

The virtual configuration data update confirming unit 322 confirms whether or not virtual configuration data has been updated. More specifically, the virtual configuration data receiving unit 303 provided in the image forming apparatus 101 transmits the device identifier of the image forming apparatus 101 to the virtual configuration data update confirming unit 322 via the Internet 104. The virtual configuration data update confirming unit 322 searches for a virtual device matching the received device identifier from among the virtual devices held by the virtual device holding unit 311.

The virtual configuration data update confirming unit 322 refers to the notification flag 806 for the searched virtual device. When the notification flag 806 is "not-notified", the virtual configuration data update confirming unit 322 determines that virtual configuration data has been updated. When the notification flag 806 is "notified", the virtual configuration data update confirming unit 322 determines that virtual configuration data has not been updated. The virtual configuration data update confirming unit 322 provides notification as to whether virtual configuration data has been updated to the virtual configuration data receiving unit 303. Then, the virtual configuration data receiving unit 303 that has confirmed the update of virtual configuration data makes a configuration data acquisition request to the virtual configuration data acquiring unit 320 of the set value management service 310.

The virtual configuration data update confirming unit 322 may also confirm whether or not virtual configuration data has been updated using the update of virtual configuration data by the virtual configuration data updating unit 317 as a trigger. Then, when the virtual configuration data update confirming unit 322 confirms that virtual configuration data has been updated, the virtual configuration data acquiring unit 320 may also acquire configuration data and transmit it to virtual configuration data receiving unit 303 provided in the image forming apparatus 101.

Figure 11:
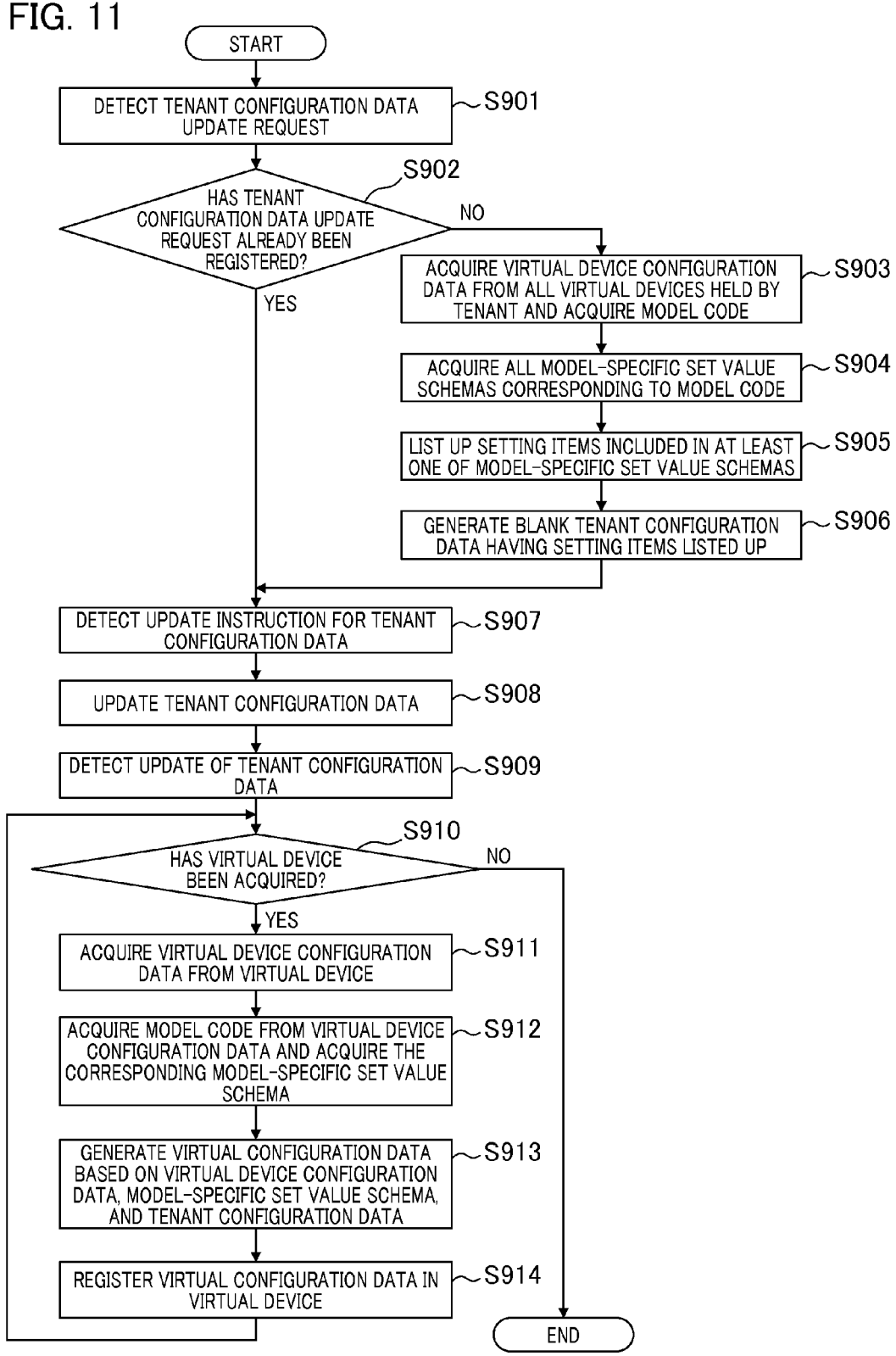
FIG. 11 is an example illustrating update processing of tenant configuration data.

FIG. 11 is an exemplary flowchart illustrating processing for updating tenant configuration data. In this example, an administrator user updates tenant configuration data using the terminal apparatus 102A. A program for executing the processes in steps of the flowchart shown in FIG. 11 is stored in any one of the storage units that are the non-volatile memory 202C, the volatile memory 203C, and the auxiliary storage device 204C and is executed by the CPU 201C.

Firstly, the tenant configuration data updating unit 315 detects a tenant configuration data update request transmitted from the terminal apparatus 102A (step S901). Next, the tenant configuration data updating unit 315 confirms whether or not tenant configuration data corresponding to the tenant configuration data update request has already been registered to the tenant configuration data holding unit 314 (step S902). When tenant configuration data corresponding to the tenant configuration data update request has already been registered, the process advances to step S907. When tenant configuration data corresponding to the tenant configuration data update request has not yet been registered, the process advances to step S903.

In step S903, the tenant configuration data updating unit 315 acquires a virtual device held by a tenant from the virtual device holding unit 311. The tenant configuration data updating unit 315 acquires virtual device configuration data included in the acquired virtual device. Then, the tenant configuration data updating unit 315 acquires a model code included in the acquired virtual device configuration data (step S903).

Next, the tenant configuration data updating unit 315 acquires model-specific set value schemas corresponding to the acquired model code from the model-specific set value schema holding unit 312 (step S904). Next, the tenant configuration data updating unit 315 lists the setting items included in at least one of the model-specific set value schemas acquired in step S904 (step S905). Then, the tenant configuration data updating unit 315 generates blank tenant configuration data having the setting items listed up in step S905 (step S906), and the process advances to step S907.

In step S907, the tenant configuration data updating unit 315 detects a specific update instruction for tenant configuration data (step S907). Then, the tenant configuration data updating unit 315 updates tenant configuration data based on the update instruction detected in step S907 (step S908). The tenant configuration data holding unit 314 stores the updated tenant configuration data.

Next, the virtual configuration data generating unit 316 detects that tenant configuration data has been updated (step S909). Then, the virtual configuration data generating unit 316 searches a virtual device, of which the tenant identifier matches the tenant identifier of tenant configuration data of which an update has been detected, from the virtual devices held by the virtual device holding unit 311. In order to perform processing for the searched virtual devices in sequence, the virtual configuration data generating unit 316 acquires one virtual device.

The virtual configuration data generating unit 316 determines whether or not the virtual device is successively acquired (step S910). When processing for all virtual devices is performed in sequence and the next virtual device cannot be acquired, the process ends. When the virtual configuration data generating unit 316 successively acquires the next virtual device, the process advances to step S911.

In step S911, the virtual configuration data generating unit 316 acquires virtual device configuration data from a virtual device to be processed (step S911). Next, the virtual configuration data generating unit 316 acquires a model code from virtual device configuration data acquired in step S911. Then, the virtual configuration data generating unit 316 acquires a model-specific set value schema corresponding to the acquired model code from the model-specific set value schema holding unit 312 (step S912).

Next, the virtual configuration data generating unit 316 generates virtual configuration data based on the virtual device configuration data, model-specific set value schema, and tenant configuration data (step S913). Then, the virtual configuration data updating unit 317 registers the generated virtual configuration data in the virtual device (step S914), and the process returns to step S910. Through the process in step S914, the updated tenant configuration data is reflected in the virtual configuration data.

Figure 12:
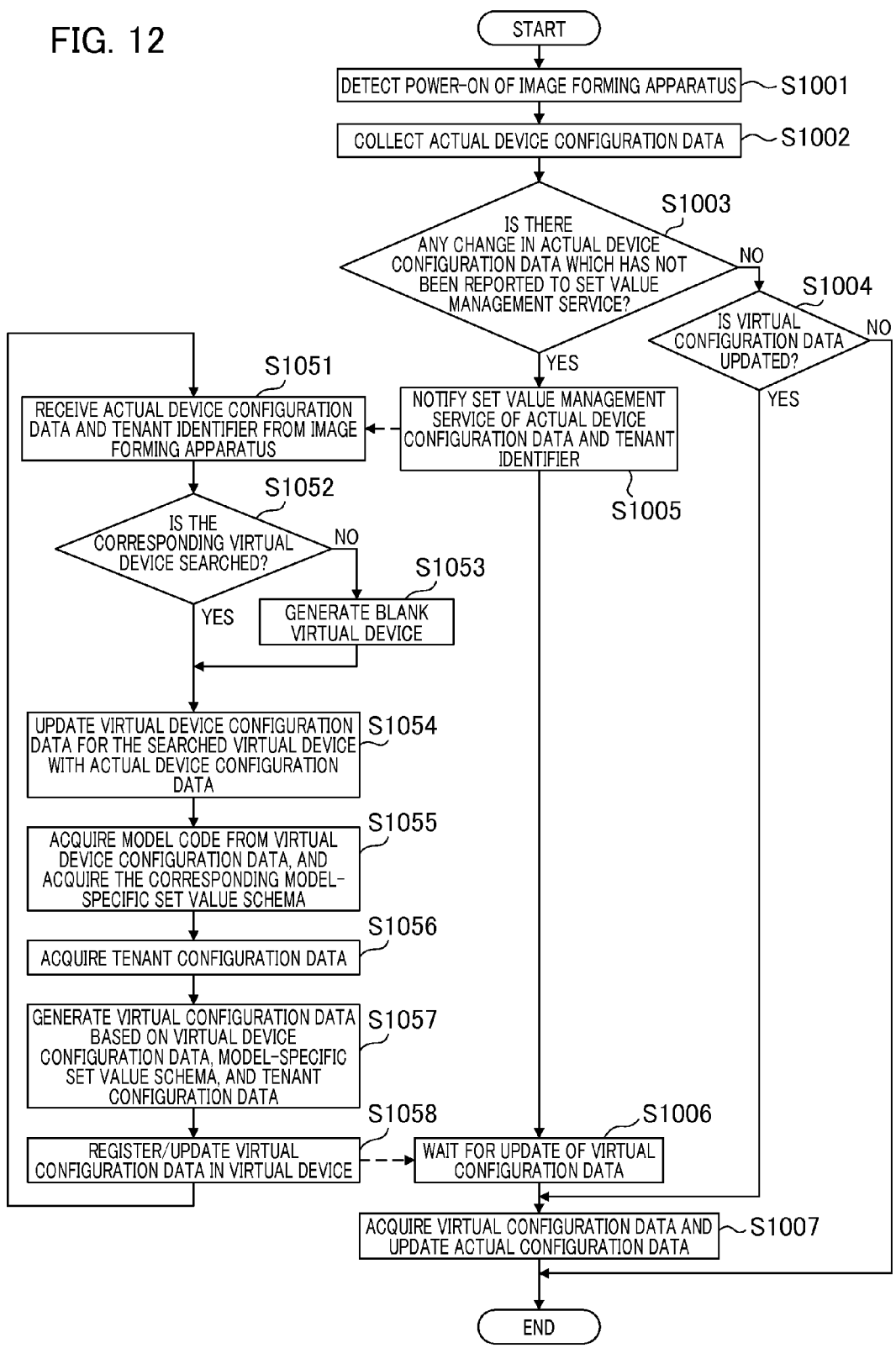
FIG. 12 is an exemplary flowchart illustrating acquisition processing of virtual configuration data.

FIG. 12 is an exemplary flowchart illustrating processing for acquiring virtual configuration data by an image forming apparatus. The processes in steps S1001 to S1007 shown in FIG. 12 are executed by an image forming apparatus. A program for executing the processes in steps of the flowchart shown in FIG. 12 is stored in any one of the storage units that are the non-volatile memory 202A, the volatile memory 203A, and the auxiliary storage device 204A and is executed by the CPU 201A. Also, the processes in steps S1051 to S1058 shown in FIG. 12 are executed by the server computer group 105. A program for executing the processes in steps of the flowchart shown in FIG. 12 is stored in any one of the storage units that are the non-volatile memory 202C, the volatile memory 203C, and the auxiliary storage device 204C, and is executed by the CPU 201C.

Firstly, the actual device configuration data notifying unit 306 of the image forming apparatus 101 detects the power-ON of the image forming apparatus 101 (step S1001). Next, the actual device configuration data collecting unit 304 collects device configuration data (step S1002).

Next, the actual device configuration data notifying unit 306 functions as a configuration change determining unit that determines whether there is any change in configuration information about the devices provided in the image forming apparatus 101. More specifically, the actual device configuration data notifying unit 306 determines whether there is any change in actual device configuration data, which has not been reported to the set value management service 310, based on actual device configuration data collected in step S1002 (step S1003).

If there is any change in actual device configuration data which has not been reported, the process advances to step S1005. If there is no change in actual device configuration data which has not been reported, the process advances to step S1004. When a new device is installed, the process advances to step S1005.

In step S1004, the virtual configuration data receiving unit 303 determines whether or not the device has already acquired the latest virtual configuration data, that is, the virtual configuration data has already been updated (step S1004). More specifically, the virtual configuration data receiving unit 303 confirms with the virtual configuration data update confirming unit 322 of the set value management service 310 via the Internet 104 whether or not virtual configuration data has been updated. The virtual configuration data receiving unit 303 determines whether or not virtual configuration data has been updated based on the confirmation result. If virtual configuration data has not been updated, the process ends. If virtual configuration data has been updated, the process advances to step S1007.

In step S1005, the actual device configuration data notifying unit 306 notifies the set value management service 310 about a configuration data generation request including actual device configuration data and the tenant identifier (step S1005). In other words, the actual device configuration data notifying unit 306 transmits a configuration data generation request including configuration information that has been changed and information about a management unit (a tenant identifier) corresponding to the image forming apparatus when determined that the configuration information has been changed. The notification destination address is an address held by the actual configuration data holding unit 301.

In step S1051, the set value management service 310 detects the notification and then perform processing. A detailed description of processing executed by the set value management service 310 will be given below.

Next, the virtual configuration data receiving unit 303 waits for the execution of the processing until the update of virtual configuration data is completed (step S1006). Next, the virtual configuration data receiving unit 303 receives virtual configuration data from the set value management service 310. In other words, the virtual configuration data receiving unit 303 acquires the operation setting information corresponding to the image forming apparatus 101 from the set value management service 310 that has generated (updated) virtual configuration data in response to the configuration data generation request. Then, the virtual configuration data updating unit 317 updates the received virtual configuration data as actual configuration data (step S1007). Actual configuration data is stored by the actual configuration data holding unit 301. In other words, the actual device configuration data notifying unit 306 and the virtual configuration data receiving unit 303 function as a requesting unit that execute following processing. The requesting unit transmits an acquisition request for operation setting information to the set value management service 310, and acquires from the set value management service 310 the operation setting information as a response to the acquisition request for the operation setting information.

In step S1051, the actual device configuration data receiving unit 318 of the set value management service 310 accepts the configuration data generation request including actual device configuration data and the tenant identifier from the image forming apparatus 101 (step S1051).

Next, among the virtual devices held by the virtual device holding unit 311, the virtual device configuration data updating unit 319 searches for a virtual device that matches the actual device configuration data and the tenant identifier both included in the configuration data generation request received in S1051 (step S1054). If the matched virtual device has been found, the process advances to step S1054. If the matched virtual device has not been found, the process advances to step S1053. When an image forming apparatus communicates with the set value management service 310 for the first time upon installation of a new device, there may be cases where searching for a virtual device is not possible. Thus, in this case, the process advances to step S1053.

In step S1053, the virtual device configuration data updating unit 319 generates a blank virtual device (step S1053), and the process advances to step S1054. Next, the virtual device configuration data updating unit 319 updates virtual device configuration data for the virtual device searched in S1052 with actual device configuration data included in the configuration data generation request received in step S1051 (step S1054). Also, the virtual device configuration data updating unit 319 sets actual device configuration data included in the configuration data generation request received in step S1051 as virtual device configuration data for the virtual device generated in step S1053. With this arrangement, the virtual device corresponding to the image forming apparatus 101 is updated.

Next, the virtual configuration data generating unit 316 acquires a model code from virtual device configuration data updated in step S1056. Then, the virtual configuration data generating unit 316 acquires a model-specific set value schema corresponding to the acquired model code from the model-specific set value schema holding unit 312 (step S1055).

Next, the virtual configuration data generating unit 316 acquires tenant configuration data (step S1056). More specifically, the virtual configuration data generating unit 316 acquires tenant configuration data corresponding to the tenant identifier received in step S1051 from tenant configuration data held by the tenant configuration data holding unit 314.

Next, the virtual configuration data generating unit 316 generates virtual configuration data based on the virtual device configuration data, model-specific set value schema, and tenant configuration data (step S1057). The process in step S1057 is the same as that in step S913 shown in FIG. 11. In other words, the virtual configuration data generating unit 316 functions as a generating unit that generates configuration data corresponding to the image forming apparatus 101 based on configuration information (device configuration data) included in the configuration data generation request.

Next, the virtual configuration data updating unit 317 updates the generated virtual configuration data by registering it in the virtual device in question (step S1058). In step S1058, the virtual configuration data acquiring unit 320 further transmits the generated virtual configuration data to the virtual configuration data receiving unit 303 of the image forming apparatus 101. In other words, the actual device configuration data receiving unit 318, the virtual device configuration data updating unit 319, the virtual configuration data generating unit 316, the virtual device holding unit 311, and the virtual configuration data acquiring unit 320 function as an managing unit that executes following processing. The managing unit manages configuration data and transmits to the image forming apparatus configuration data corresponding to the image forming apparatus upon request of the configuration data from the image forming apparatus.

Next, a description will be given of relocation processing of an application executed by an information processing system of the present embodiment with respect to an image forming apparatus. The relocation processing of the application is sequentially executed according to the following steps A to D.

Step A. Creation and distribution of application rearrangement information by a terminal device and a server computer group Step B. Application rearrangement based on rearrangement decided information by the terminal device and the image forming apparatus Step C. Start of a rearrangement decided application (rearrangement application) by the terminal device and the image forming apparatus Step D. Reflection of application rearrangement decided information by the terminal device and the server computer group Employment of the present invention is not limited to relocation processing of the application. For example, the present invention can be employed to relocation processing of a license of the application managed by the contract management service 1101.

<Creation and Distribution of Application Rearrangement Information by Terminal Device and Server Computer Group>

Figure 13:
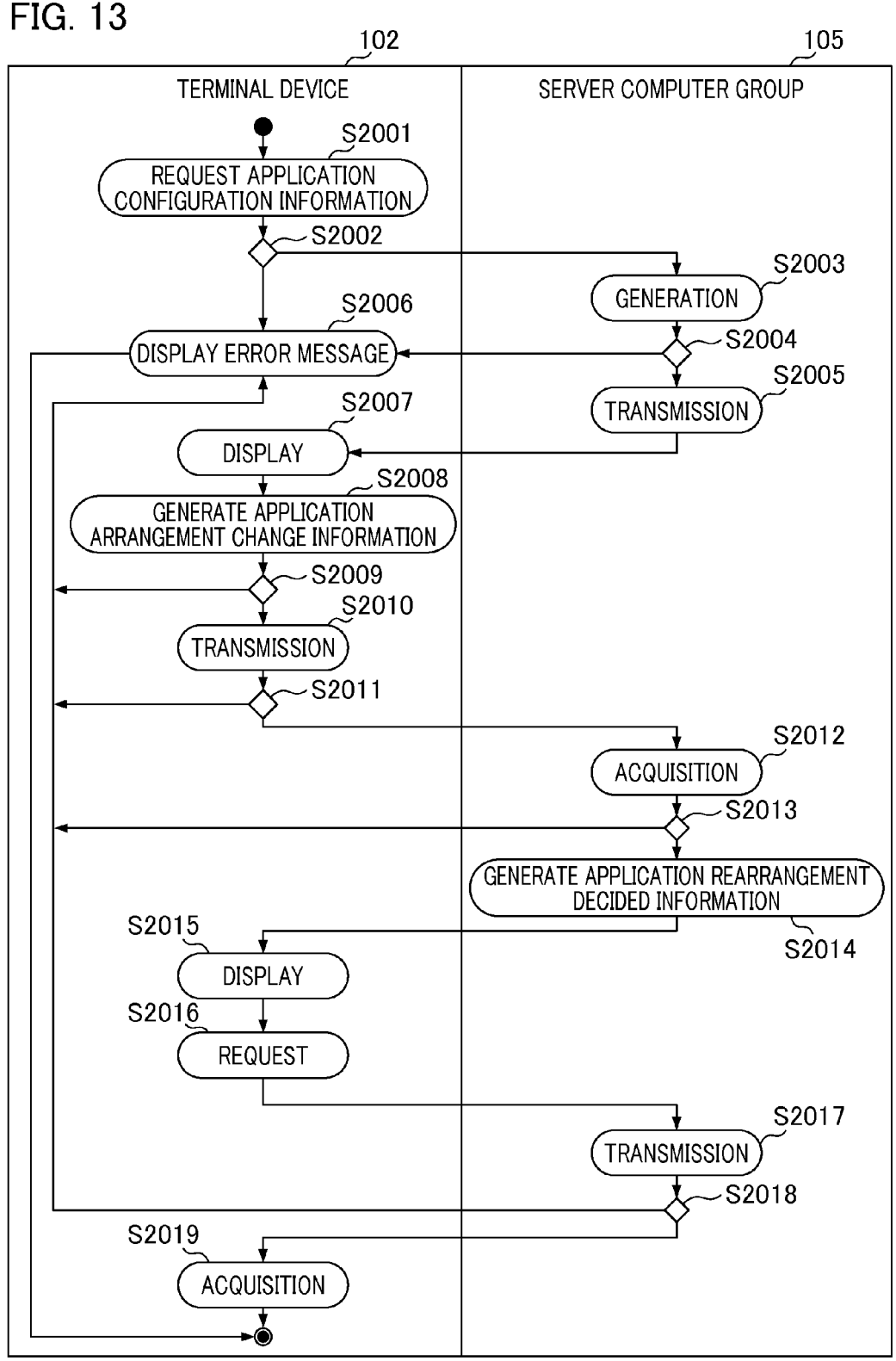
FIG. 13 is a diagram illustrating creation of application relocation information.

FIG. 13 is an example of an activity diagram illustrating creation of application relocation information performed by a terminal device 102 and a contract management service 1101 provided in a server computer group 105.

Firstly, the terminal device 102 requests application configuration information corresponding to the image forming apparatus 101 in each tenant to the contract management service 1101 by use of REST (step S2001). The application configuration information includes attribute information of the image forming apparatus 101 and attribute information of an application installed on the image forming apparatus 101. The attribute information of the image forming apparatus 101 is, for example, a model name, a device identifier, and a device specification. The attribute information of the application, for example as an application identifier, the version number, and the device specification.

The terminal device 102 determines whether or not transmission of the request of application configuration information has succeeded (step S2002). When transmission of the request of application configuration information has succeeded, the application information acquiring unit 394 of the contract management service 1101 acquires tenant-specific application information (FIGS. 6A to 7B) from the tenant-specific application information holding unit 396. Then, the application information acquiring unit 394 generates application configuration information of the image forming apparatus that belongs to a request source tenant based on the acquired tenant-specific application information (step S2003). For example, the application information acquiring unit 394 generates application configuration information of the image forming apparatus that belongs to the tenant A.

When transmission of the request of application configuration information has failed, the terminal device 102 completes the process by displaying an error message (step S2006). In the present embodiment, an example of application configuration information with the aforementioned REST is as follows. This request is for transmission of application configuration information of the image forming apparatus corresponding to the tenant A. http://api.servercomputer.com/device-info.sxml?tenant_id=A Next, the application information acquiring unit 394 determines the success and failure of the generation of application configuration information (step S2004). When the generation of application configuration information has succeeded, the application information acquiring unit 394 transmits the application configuration information to the terminal device 102 that is the request source (step S2005). In the present embodiment, application configuration information is generated in a SXML format and the like shown in FIG. 14.

Referring back to FIG. 13, when generation of application configuration information has failed, the application information acquiring unit 394 transmits the error message to the terminal device 102 (step S2006). The terminal device 102 that has received application configuration information from the application information acquiring unit 394 displays this application configuration information (step S2007).

Figure 15:
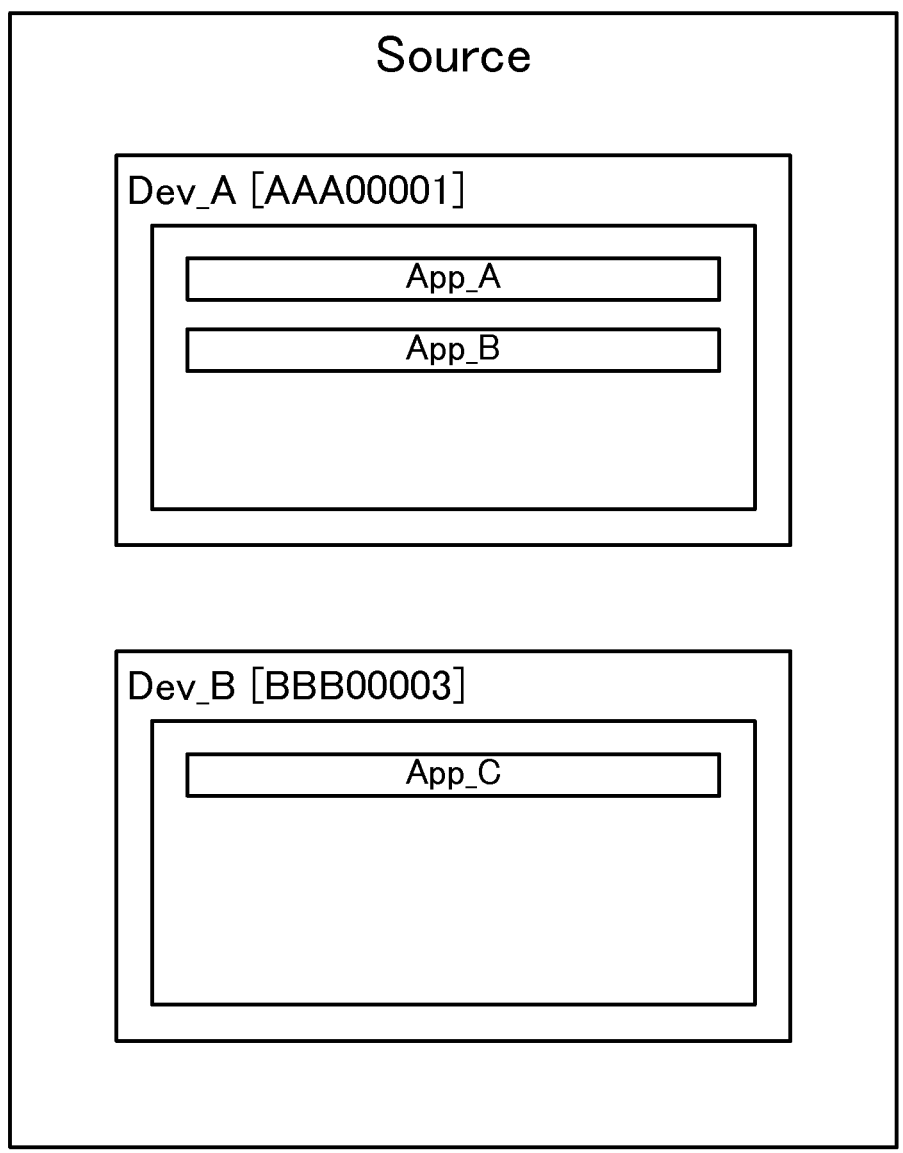
FIG. 15 is an example of a user interface on which application configuration information is displayed.

FIG. 15 is a diagram illustrating an exemplary user interface in the terminal device on which application configuration information is displayed. Device lists are displayed in the user interface, and application lists that are installed on each device in the tenant are further displayed in the user interface. "Source" shown in FIG. 15 indicates that devices during display are the devices (existing devices) before being rearranged. In this example, an application "App_A" and an application "App_B" are present in the existing device Dev_A. Also, an application "App_C" are present in the existing device Dev_B.

An administrator can edit application configuration information displayed on the user interface shown in FIG. 15 so as to generate an application relocation request. The application relocation request is a request for demanding relocation of the application with respect to the image forming apparatus after being rearranged.

Figure 16:
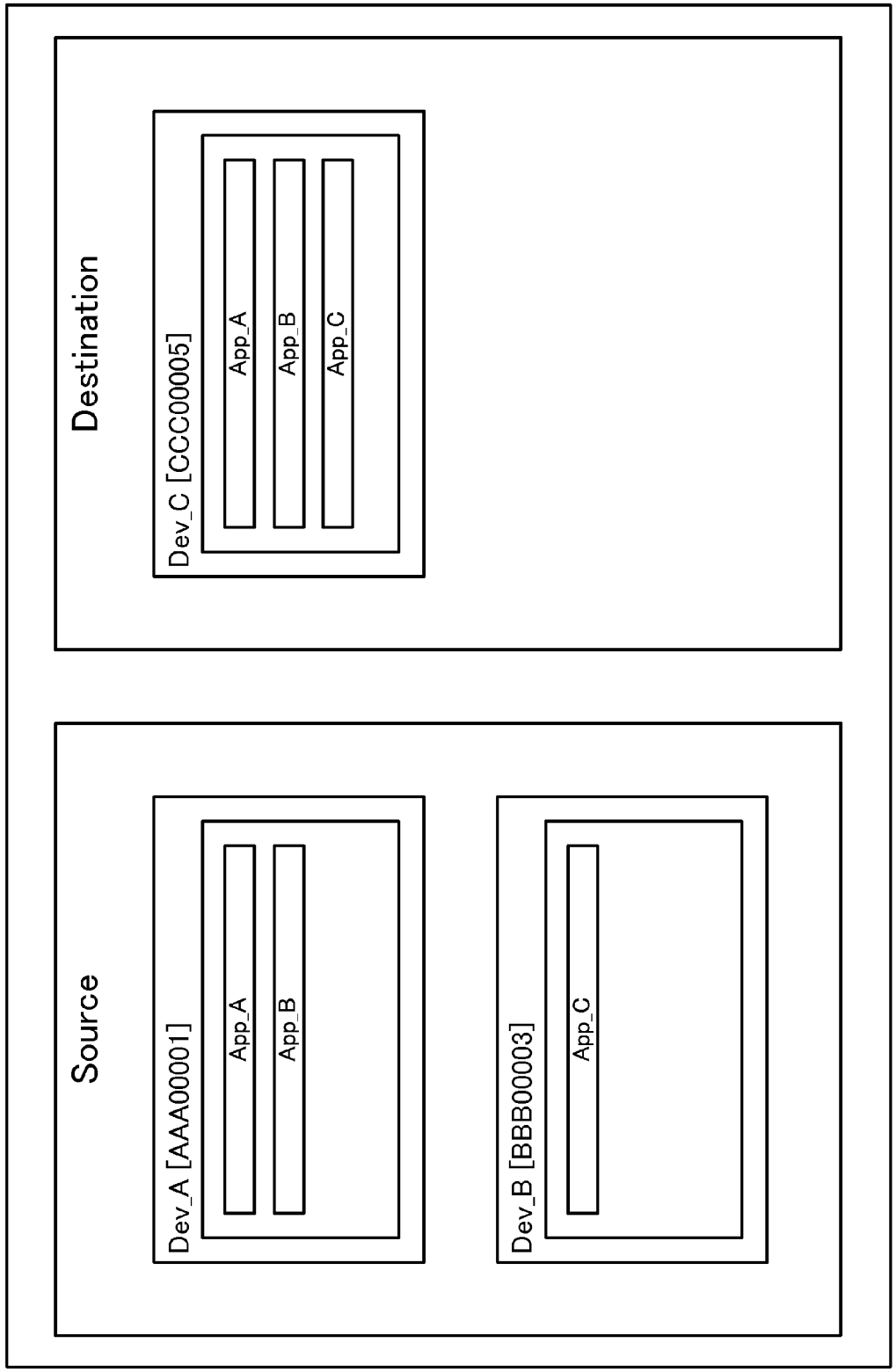
FIG. 16 is a diagram illustrating generation processing of an application relocation request.

FIG. 16 is a diagram illustrating generation processing of the application relocation request. The terminal device 102 displays a screen shown in FIG. 16 according to a user operation on the user interface shown in FIG. 15. "Destination" shown in FIG. 16 indicates a display field (forwarding destination display field) to be required for the image forming apparatus after being rearranged and applications that need to be applied to the target image forming apparatus after being rearranged. The terminal device 102 generates the application rearrangement request according to the content displayed on the forwarding destination display field.

In this example, it is assumed that the administrator gathers the App_A and the App_B installed on the Dev_A, and the App_C installed on the Dev_B into the device Dev_C that is newly placed. Hence, the terminal device 102 generates application arrangement change information for instructing to install the App_A, the App_B, and the App_C on the device Dev_C. Then, the terminal device 102 generates the application relocation request including the generated application arrangement change information (step S2008 in FIG. 13).

Next, the terminal device 102 determines the success and failure of the generation of the application relocation request (step S2009). When the generation of the application relocation request has succeeded, the terminal device 102 packages the application relocation request in a SXML format and the like shown in FIG. 17.

FIG. 17 illustrates application arrangement change information included in the application relocation request. One level below the tenant identifier, among the image forming apparatuses owned by the tenant, the image forming apparatus after being rearranged is listed, and attribute information of the image forming apparatus is listed one level below this image forming apparatus. In attribute information of the image forming apparatus, a model name of the image forming apparatus, a device identifier of the image forming apparatus, a device specification identifier of the image forming apparatus, and applications list are listed. The applications list is a list that needs to be applied to the image forming apparatus after being rearranged. Attribute information of each application is further listed one level below the listed applications. An application name, a version number, a device specification identifier of the image forming apparatus that is capable of installing the application are listed in attribute information of the each application. In other words, application arrangement change information includes at least attribute information having an application operation condition of the image forming apparatus after being relocated (the device specification) and attribute information of an applying target application. The applying target application is an application which the terminal device 102 requests the image forming apparatus after being rearranged to apply.

Referring back to FIG. 13, the terminal device 102 transmits the packaged application relocation request to the application information acquiring unit 394 of the contract management service 1101 (step S2010). When the generation of the application relocation request has failed, the terminal device 102 completes the process by displaying an error massage (step S2006).

Next, the terminal device 102 determines the success and failure of transmission of the application relocation request (step S2011). When transmission of the application relocation request has succeeded, the application information acquiring unit 394 acquires the application relocation request packaged in the SXML format (step S2012). When transmission of the application relocation request has failed (step S2011), the terminal device 102 completes the process by displaying the error message (step S2006).

Next, the application information acquiring unit 394 determines the success and failure of acquisition of the application relocation request (step S2013). When acquisition of the application relocation request has succeeded, the application arranging unit 395 generates application rearrangement decided information (step S2014), and returns it to the terminal device 102. The application rearrangement decided information is information (rearrangement information) about the image forming apparatus after being rearranged and the applications for which application to the image forming apparatus after being reconfigured has been decided. That is, the application arranging unit 395 functions as a transmitting unit that executes the following processing. The application arranging unit 395 decides the application corresponding to the image forming apparatus after being rearranged as a rearrangement application based on relocation information (application arrangement change information) included in the application relocation request. The application arranging unit 395 responds to the terminal device 102 with rearrangement information relating to the image forming apparatus after being rearranged and the rearrangement application.

FIG. 18 is a diagram illustrating an example of application rearrangement decided information. A "ver_up" attribute is added to the application rearrangement decided information as an attribute of the application to be applied to the image forming apparatus after being rearranged. The "ver_up" attribute indicates whether or not a version upgrade of the application included in the application arrangement change information is required. The fact that the "ver_up" attribute is "t" means that the version upgrade is required in order to install the application on the image forming apparatus after being rearranged. The fact that the "ver_up" attribute is "nil" means that the version upgrade is not required in order to install the application on the image forming apparatus after being rearranged. In other words, the application rearrangement decided information includes at least attribute information of the image forming apparatus after being relocated and attribute information of the rearrangement application to be applied to the target image forming apparatus after being relocated.

The application arranging unit 395 generates application rearrangement decided information based on application arrangement change information included in the application relocation request and tenant-specific application information held by the tenant-specific application information holding unit 396. A description of generation processing of the application rearrangement decided information will be given below with reference to FIG. 20.

Referring back to FIG. 13, when the generation processing of application rearrangement decided information in step S2014 has been completed, the application arranging unit 395 transmits the application rearrangement decided information to the terminal device 102. The terminal device 102 displays a content of the application rearrangement decided information received from the application arranging unit 395 on the screen (step S2015). When an acquisition of rearrangement requesting information has failed, the application information acquiring unit 394 transmits information indicating a failure of acquisition, and the terminal device 102 completes the process by displaying the error message (step S2006).

Figure 19:
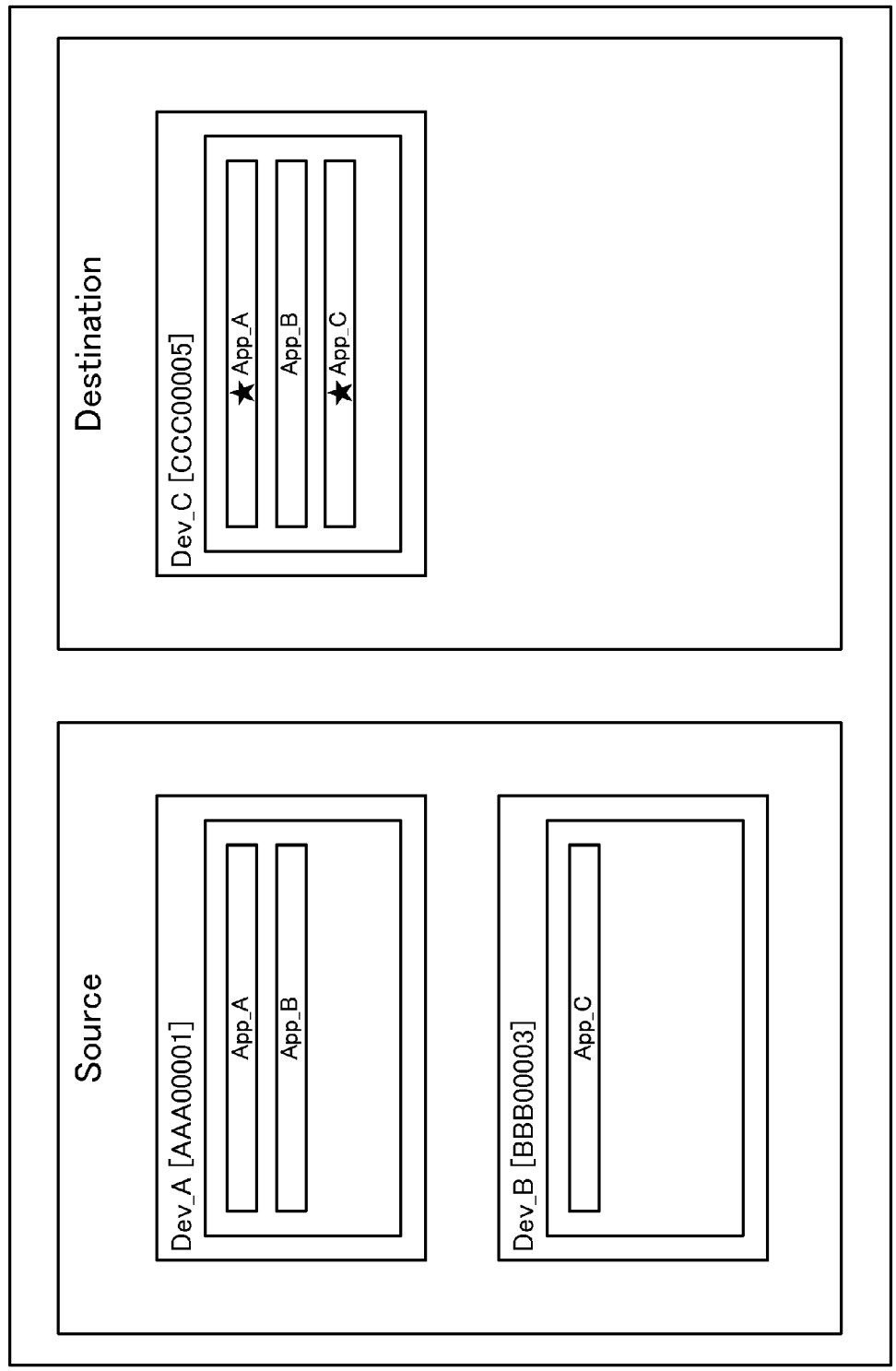
FIG. 19 is an example of a user interface on which a content of application rearrangement decided information is displayed.

FIG. 19 is an example a user interface on which a content of application rearrangement decided information is displayed. The content displayed on a field (forwarding destination display field) on which characters "Destination" shown in FIG. 19 is displayed corresponds to the content of the application rearrangement decided information.

Among applications included in the application rearrangement decided information, the application to which a mark "★" is added indicates that the "ver_up" attribute is "t", that is, an application for which a version upgrade is required for installation on the image forming apparatus.

Referring back to FIG. 13, the terminal device 102 executes the following processing according to an operation by the administrator who has confirmed the content of application rearrangement decided information displayed on the user interface shown in FIG. 19. The terminal device 102 requests the application rearrangement decided information to the contract management service 1101 (step S2016).

Next, the application arranging unit 395 of the contract management service 1101 transmits the application rearrangement decided information to the terminal device 102 (step S2017). Then, the application arranging unit 395 determines whether or not the application rearrangement decided information has been successfully transmitted (step S2017). When transmission of the application rearrangement decided information has failed, the process returns to step S2006. When transmission of the application rearrangement decided information has succeeded, the terminal device 102 acquires the application rearrangement decided information (step S2019).

Figure 20:
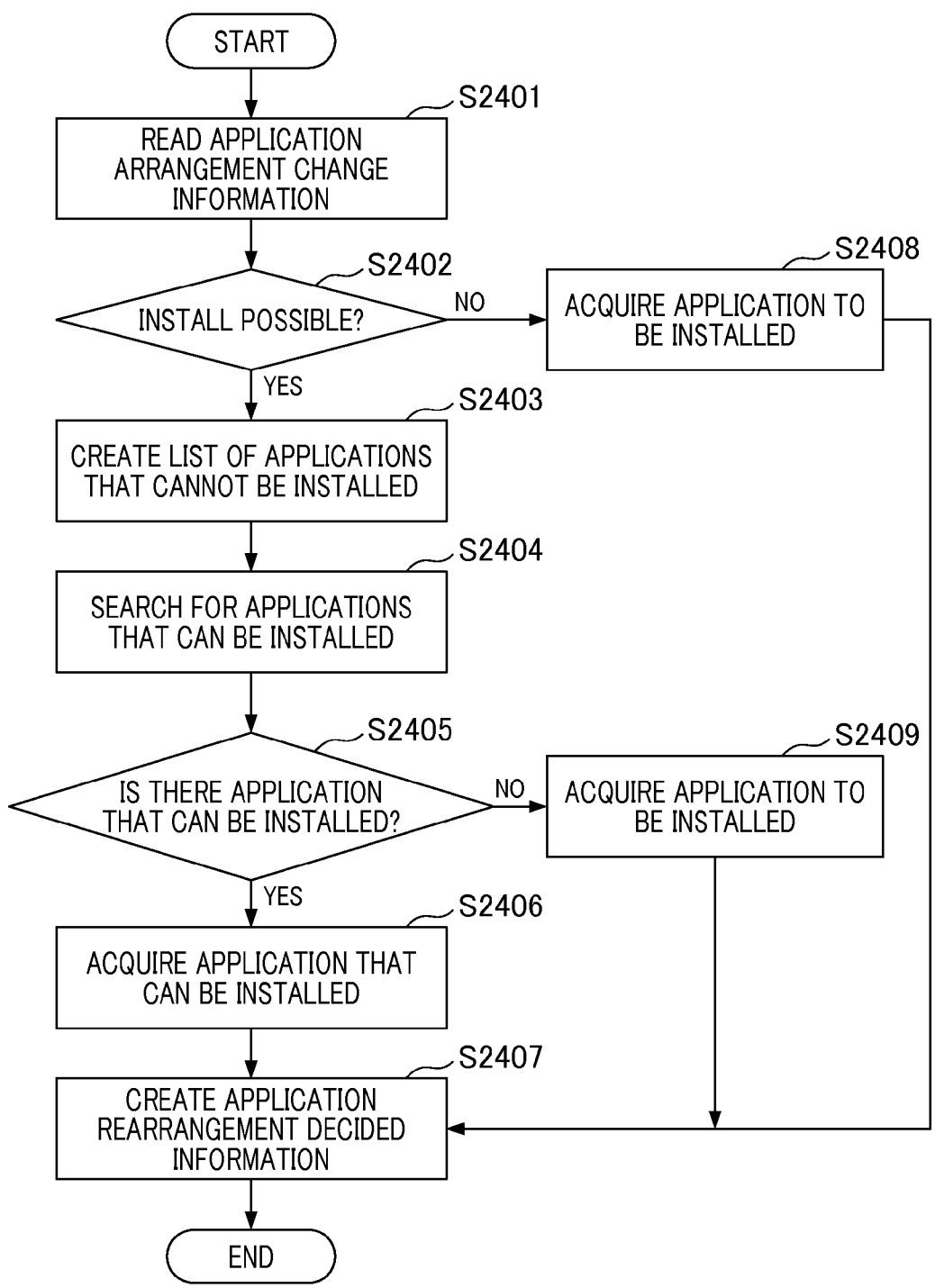
FIG. 20 is a flowchart illustrating generation processing of application rearrangement decided information.

FIG. 20 is a flowchart illustrating generation processing of the application rearrangement decided information in step S2014 of FIG. 13. Firstly, the application arranging unit 395 reads the application arrangement change information shown in FIG. 17(step S2401). Subsequently, the application arranging unit 395 determines whether or not the application included in the application arrangement change information as a target can be installed on the image forming apparatus after being rearranged (step S2402). When the application can be installed on the image forming apparatus after being rearranged, the process advances to step S2408. When the application cannot be installed on the image forming apparatus after being rearranged, the process advances to step S2403.

An example of determination processing in step S2402 will be given below. Firstly, the application arranging unit 395 acquires the application name "App_A" that is listed first and its version number "1.0" included in the application arrangement change information shown in FIG. 17.

The application arranging unit 395 refers to the specification information compatible with an application shown in FIG. 7A to thereby acquire a value "001" of the device specification identifier corresponding to the acquired "App_A" and the version number "1.0". The application arranging unit 395 determines whether or not the acquired value "001" of the device specification identifier matches the device specification "002" of the image forming apparatus after being rearranged included in the application arrangement change information (FIG. 17). The image forming apparatus after being rearranged is an image forming apparatus corresponding to the device identifier "CCC00005".

In this example, "001" does not match "002". Hence, the application arranging unit 395 determines that the "App_A" cannot be installed on the image forming apparatus after being rearranged. By the same means as the aforementioned manner, the application arranging unit 395 determines that the application "App_C" that is listed third and is included in the application arrangement change information also cannot be installed on the image forming apparatus after being rearranged.

In contrast, the application arranging unit 395 determines that the application "App_B" that is listed second and is included in the application arrangement change information can be installed on the image forming apparatus after being rearranged through the following processing. Firstly, the application arranging unit 395 acquires the "App_B" and its version number"1.0" from the application arrangement change information.

Next, the application arranging unit 395 acquires a value "*" of the device specification identifier corresponding to the acquired "App_B" and the version number "1.0" with reference to the specification information compatible with an application shown in FIG. 7A. The "*" indicates that the device specification has no limitation. Thus, the device specification corresponding to the "App_B" and the version number "1.0" matches the device specification of the image forming apparatus after being rearranged. As a result, the application arranging unit 395 determines that the "App_B" can be installed on the image forming apparatus after being rearranged.

In other words, the application arranging unit 395 specifies an application operational condition (device specification) corresponding to the applying target application based on attribute information of the applying target application included in the application relocation request and specification information compatible with an application shown in FIG. 7A. When the specified application operational condition matches the application operational condition of the image forming apparatus after being relocated included in the application relocation request, the application arranging unit 395 decides that the applying target application is a rearrangement application.

In step S2408, the application arranging unit 395 acquires the application that can be installed on the image forming apparatus after being rearranged (application to be applied) from the application holding unit 397, the process advances to step S2407.

In step S2403, the application arranging unit 395 creates a list of the application that cannot be installed as a result of the determination. The application arranging unit 395 searches for the application that has the same application name as the application included in this list each for the application and that can be installed (step S2404). The application arranging unit 395 determines whether or not the application that can be installed on the image forming apparatus after being rearranged has been found (step S2405).

A description of processing in step S2404, S2405 will be given. The application arranging unit 395 acquires the device specification included in the list created in step S2404 with reference to specification information compatible with an application shown in FIG. 7A. The application arranging unit 395 determines whether or not the device specification that matches the device specification "002" of the image forming apparatus after being rearranged is present in the acquired device specs.

When the device specification that matches the device specification "002" of the image forming apparatus after being rearranged is present, the application arranging unit 395 executes the following processing with reference to the device specification information shown in FIG. 7B. The application arranging unit 395 determines whether or not the contract management service 1101 manages the image forming apparatus after being rearranged. When the contract management service 1101 manages the image forming apparatus after being rearranged, the application arranging unit 395 determines that the application that can be installed on the image forming apparatus after being rearranged has been found. In other words, the application arranging unit 395 determines that the application having the device specification that matches the device specification "002" of the image forming apparatus after being rearranged is an application that can be installed on the image forming apparatus after being rearranged.

In the present embodiment, the list created in step S2404 includes the "App_A" and the "App_C". The application arranging unit 395 specifies a record corresponding to the device specification that matches the device spec "002" of the image forming apparatus after being rearranged among the records corresponding to the "App_A" included in the specification information compatible with an application shown in FIG. 7A. In this example, the second record is specified as a record corresponding to the device specification "002" of the image forming apparatus after being rearranged.

Also, the application arranging unit 395 specifies a record corresponding to the device specification that matches the device spec "002" of the image forming apparatus after being rearranged among the records corresponding to the "App_C" included in the specification information compatible with an application shown in FIG. 7A. In this example, the fifth record is specified as a record corresponding to the device spec "002" of the image forming apparatus after being rearranged.

Also, the application arranging unit 395 determines whether or not a record of which the device specification information shown in FIG. 7B corresponds to the image forming apparatus after being rearranged (that is, the image forming apparatus of which the device identifier is "CCC00005" and the device spec is "002") is present. In this example, the record corresponding to the "Dev_C" is a record corresponding to the image forming apparatus after being rearranged. Thus, the application arranging unit 395 determines that the contract management service 1101 manages the image forming apparatus after being rearranged.

Then, the application arranging unit 395 decides that the application "App_A" of which the version is "1.01" and that corresponds to the second record of the specified specification information compatible with an application is the application that can be installed on the image forming apparatus after being rearranged. Also, the application arranging unit 395 decides that the application "App_C" of which the version is "1.01" and that corresponds to the fifth record of the specified specification information compatible with an application is the application that can be installed on the image forming apparatus after being rearranged.

Those decided applications are rearrangement applications. In other words, among applications of which the kind is the same as but the version is different from the applying target application, the application arranging unit 395 searches for the application of which the application operational condition of the image forming apparatus after being relocated matches each other base on specification information compatible with an application. The application arranging unit 395 decides that the application is a rearrangement application. In this manner, the version upgrade of the application to be applied is enabled depending on the specification of the image forming apparatus after being rearranged.

When the application that can be installed on the image forming apparatus after being rearranged has not been found, the application arranging unit 395 acquire the application to be installed (step S2409), and the process advances to step S2407.

When the application that can be installed on the image forming apparatus after being rearranged has been found, the application arranging unit 395 acquires the found application from the application holding unit 397(step S2406). Then, the application arranging unit 395 creates, for example, application rearrangement decided information shown in FIG. 18 (step S2407), and completes the process.

<Application Rearrangement Based on Rearrangement Decided Information by Terminal Device and Image Forming Apparatus>

The terminal device 102 that has acquired application rearrangement decided information commences a relocation of the application by transmitting an application rearrangement start instruction including application rearrangement decided information to the image forming apparatus 101.

Figure 21:
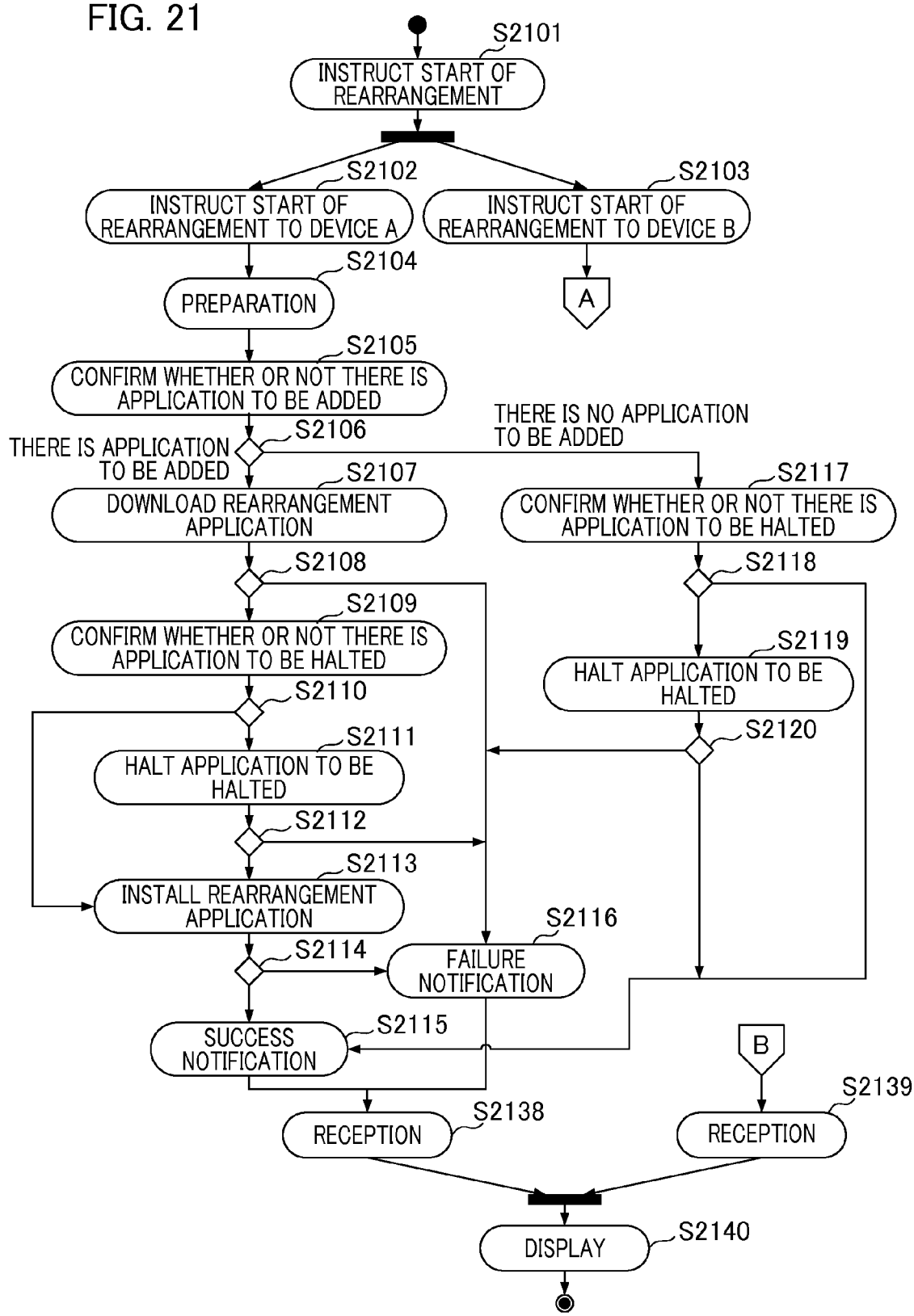
FIG. 21 is a diagram (1) illustrating start processing of application relocation.
Figure 22:
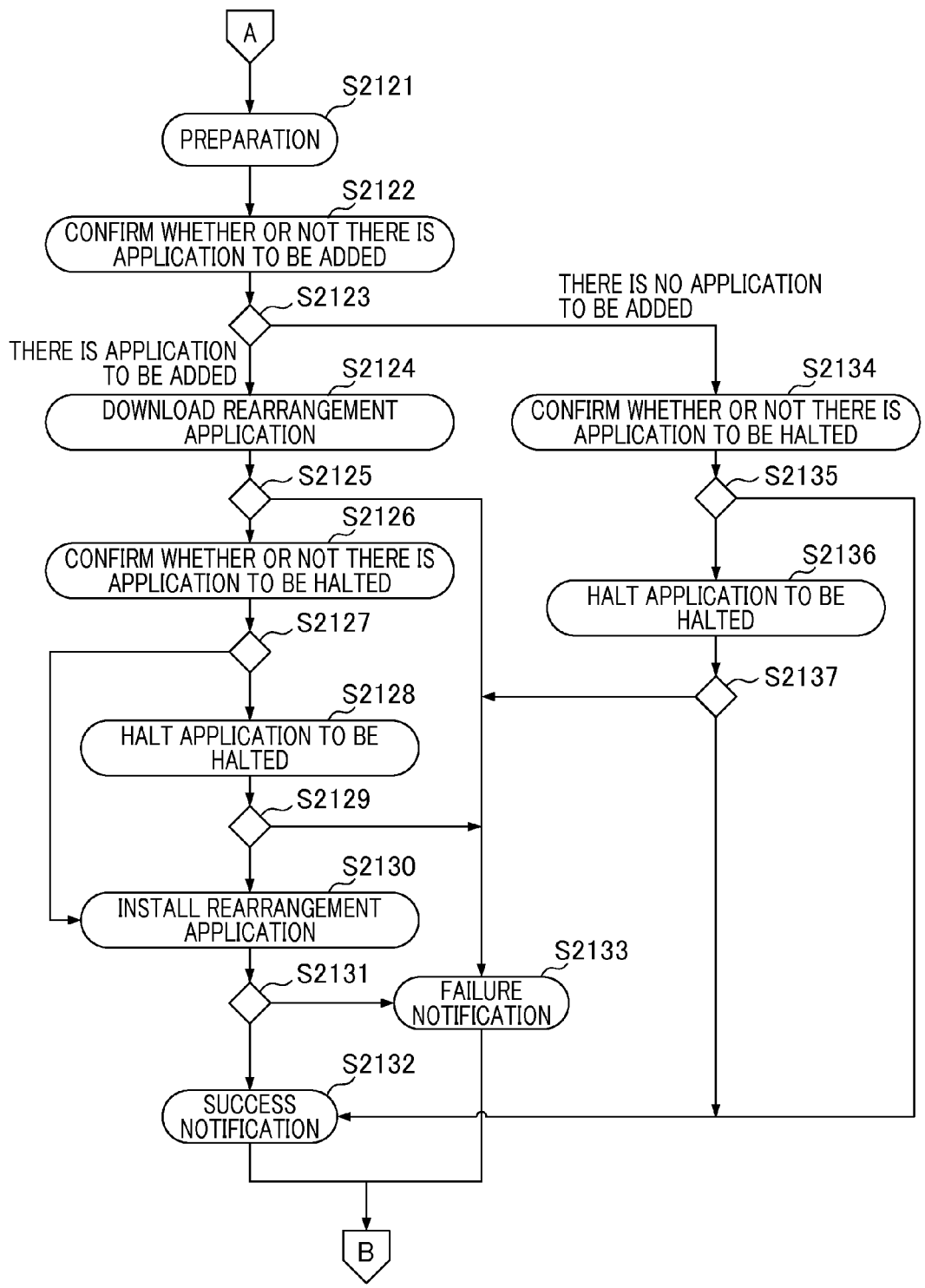
FIG. 22 is a diagram (2) illustrating start processing of application relocation.

FIG. 21 and FIG. 22 are activity diagrams illustrating start processing of application relocation. Note that the image forming apparatus 101 before being replaced may or may not be present. The image forming apparatus after being replaced should be present, and needs to be capable of communicating with the terminal device 102 via the Internet 104 or the network 106. In this example, there is an image forming apparatus corresponding to the device identifier "AAA00001" and the device identifier "BBB00003" as the image forming apparatus 101 before being replaced. Also, there is an image forming apparatus corresponding to the device identifier "CCC00005" as an image forming apparatus 101 after being replaced.

Firstly, as shown in FIG. 21, the terminal device 102 generates an application rearrangement start instruction to provide instructs to the image forming apparatus 101 under a certain user environment 100 (step S2101). The application rearrangement start instruction is control information that provides instructs for a rearrangement of the application to be applied (rearrangement instruction), and includes application rearrangement decided information. The terminal device 102 transmits the application rearrangement start instruction to each image forming apparatus 101 when a plurality of the image forming apparatuses 101 is present under the user environment 100(steps S2102, S2103).

In this example, in step S2102, it is assumed that the application rearrangement start instruction is transmitted to the image forming apparatus of the device identifier "AAA00001" and the image forming apparatus of the device identifier "BBB00001". Hereinafter, the image forming apparatus of the device identifier "AAA00001" is also referred to "device A". The image forming apparatus of the device identifier "BBB00001" is also referred to "device B". Also, in step S2103, it is assumed that the application rearrangement start instruction is transmitted to the image forming apparatus of the device identifier "CCC00005" (hereinafter as referred to "device C"). The device C is an image forming apparatus after being rearranged.

A description will be given of processing by the image forming apparatus 101 that has received the application rearrangement start instruction from the terminal device 102. Firstly, the application managing unit 392 functions as an accepting unit that accepts the application rearrangement start instruction. The application managing unit 392 analyzes application rearrangement decided information included in the application rearrangement start instruction. Specifically, the application managing unit 392 analyzes whether or not the application is added or updated, or the application should be halted. In this manner, the application managing unit 392 prepares to start the rearrangement (step S2104).

Next, the application managing unit 392 confirms/determines whether or not the application is applied to the device (steps S2105, S2106). Specifically, the application managing unit 392 acquires attribute information of the image forming apparatus after rearrangement and attribute information of the rearrangement application from application rearrangement decided information included in the rearrangement start instruction. The application managing unit 392 determines whether or not the image forming apparatus after being relocated is the host device and the rearrangement application that is not provided in the host device is present, based on the acquired attribute information of the image forming apparatus and attribute information of the rearrangement application. When the image forming apparatus after being relocated is the host device and the rearrangement application that is not provided in the own device is present, the application managing unit 392 determines that there is an application to be added to the host device, that is, the rearrangement application needs to be applied to the host device. In other words, the application managing unit 392 functions as a determining unit that determines whether or not applying the rearrangement application to the image forming apparatus is required based on the application rearrangement decided information included in the application rearrangement instruction.

In this example, the device identifier of the image forming apparatus after being rearranged included in the application rearrangement decided information is "CCC00005". Hence, the application managing unit 392 confirms that the image forming apparatus after being relocated is not the host device, thus the application is not added to the host device.

When the application managing unit 392 determines there is the application to be added to the host device, the application managing unit 392 downloads the rearrangement application (step S2107). In other words, the application arranging unit 395 of the contract management service 1101 functions as distributing unit that distributes the rearrangement application to the image forming apparatus after being relocated upon request of the image forming apparatus after being rearranged. Also, the application managing unit 392 of the image forming apparatus 101 functions as an acquiring unit that requests the rearrangement application from the contract management service 1101, and acquires the rearrangement application from the contract management service 1101 that has responded to the request. Subsequently, the application managing unit 392 determines the success and failure of the download of the rearrangement application (step S2108). When download of the rearrangement application has failed, the application managing unit 392 notifies the terminal device 102 of a failure of the process (step S2116).

When download of the rearrangement application has succeeded, the application managing unit 392 confirms/determines that an application to be halted is present in the host device with reference to the applications that have been installed on the host device (steps S2109, S2110). The application to be halted is a same kind of application as the rearrangement application. In the device A, the "App_A" and the "App_B" are applications to be halted. The application to be halted is a target for a halt/uninstallation.

When the application to be halted has not been installed on the host device, the application managing unit 392 instructs the application installing unit 393 to install the rearrangement application (step S2113). In other words, the application managing unit 392 functions as an applying unit that applies the downloaded rearrangement application.

When the application to be halted has been installed on the host device, the application managing unit 392 halts the application to be halted (step S2111). In other words, the application managing unit 392 functions as a halting unit that halts the application included in the downloaded rearrangement application among the applications that has been already applied to the host device. The application managing unit 392 determines the success and failure of the halt of the application to be halted (step S2112). When the halt of the rearrangement application has failed, the process advances to step S2116. When the halt of the application to be halted has succeeded, the process advances to step S2113.

In step S2113, the application managing unit 392 instructs the application installing unit 393 to install the rearrangement application (step S2113). Subsequently, the application managing unit 392 determines the success and failure of installation of the rearrangement application (step S2114). When the installation has succeeded, the application managing unit 392 notifies the terminal device 102 of the success of the process (installation completion) (step S2115). When installation has failed, the application managing unit 392 notifies the terminal device 102 of the failure of the process (step S2116).

In the determination process in step S2106, when it is determined that there is no application to be added to the host device, the application managing unit 392 confirms/determines whether or not the application to be halted in the host device is present (step S2117). When the device A of which the device identifier is "AAA00001" is an object of the process, the application managing unit 392 confirms that the application "App_A" and "App_B" that are operated on the device A are the applications to be halted in the step S2117. When the application to be halted is not provided in the host device, the process advances to step S2115.

When the application to be halted is provided in the host device, the application managing unit 392 halts the rearrangement application (step S2119). Subsequently, the application managing unit 392 determines the success and failure of halt of the application to be halted (step S2120). When halt of the rearrangement application has failed, the process advances to step S2116. When halt of the rearrangement application has succeeded, the process advances to step S2115.

The processes in steps S2121 to S2137 shown in FIG. 22 are executed by the device C. The processes in steps S2121 to S2137 are the same as the processes in steps S2104 to S2120 shown in FIG. 21, thus a detailed description is omitted. In this example, the device identifier of the image forming apparatus after being rearranged included in application rearrangement decided information is "CCC00005". Also, the rearrangement applications (the App_A, the App_B, and the App_C) are not included in the applications provided in the host device. Thus, the application managing unit 392 confirms that the image forming apparatus after being relocated is the host device, and there are applications to be added to the host device in steps S2122, S2123.

Also, in step S2130, the application managing unit 392 installs the rearrangement applications (the App_A to the App_C). Also, in step S2132 of FIG. 22, when the application managing unit 392 notifies the terminal device 102 of a success of the process, the process advances to step S2139 of FIG. 21.

Referring back to FIG. 21, in steps S2138 and S2139, the terminal device 102 receives an installation completion notification from the image forming apparatus 101. Then, the terminal device 102 displays a completion status of the relocation of the application on the screen (step S2140).

<Start of Rearrangement Application by Terminal Device and Image Forming Apparatus>

Figure 23:
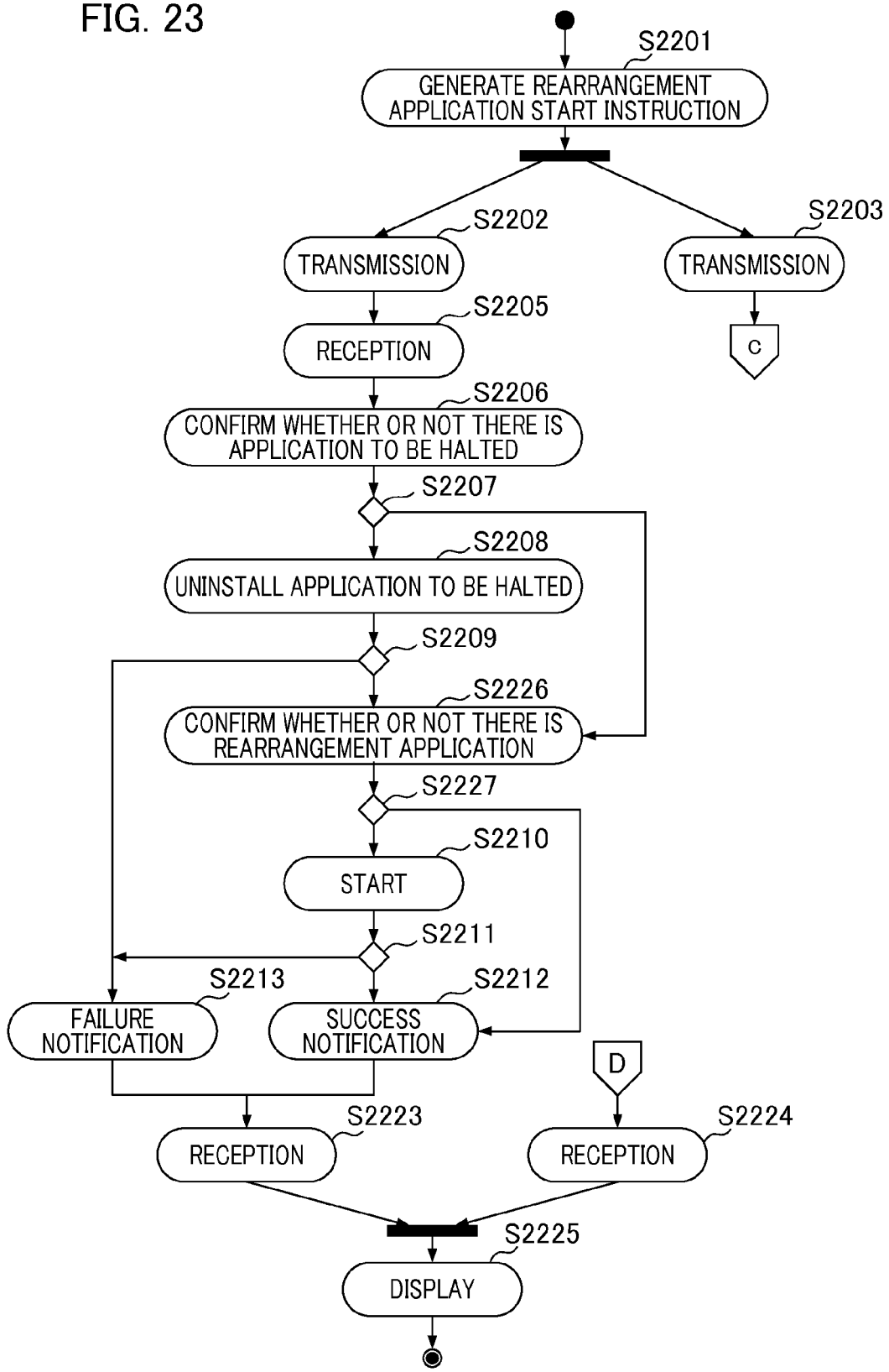
FIG. 23 is a diagram (1) illustrating operation processing by an image processing apparatus that receives a rearrangement application start instruction.
Figure 24:
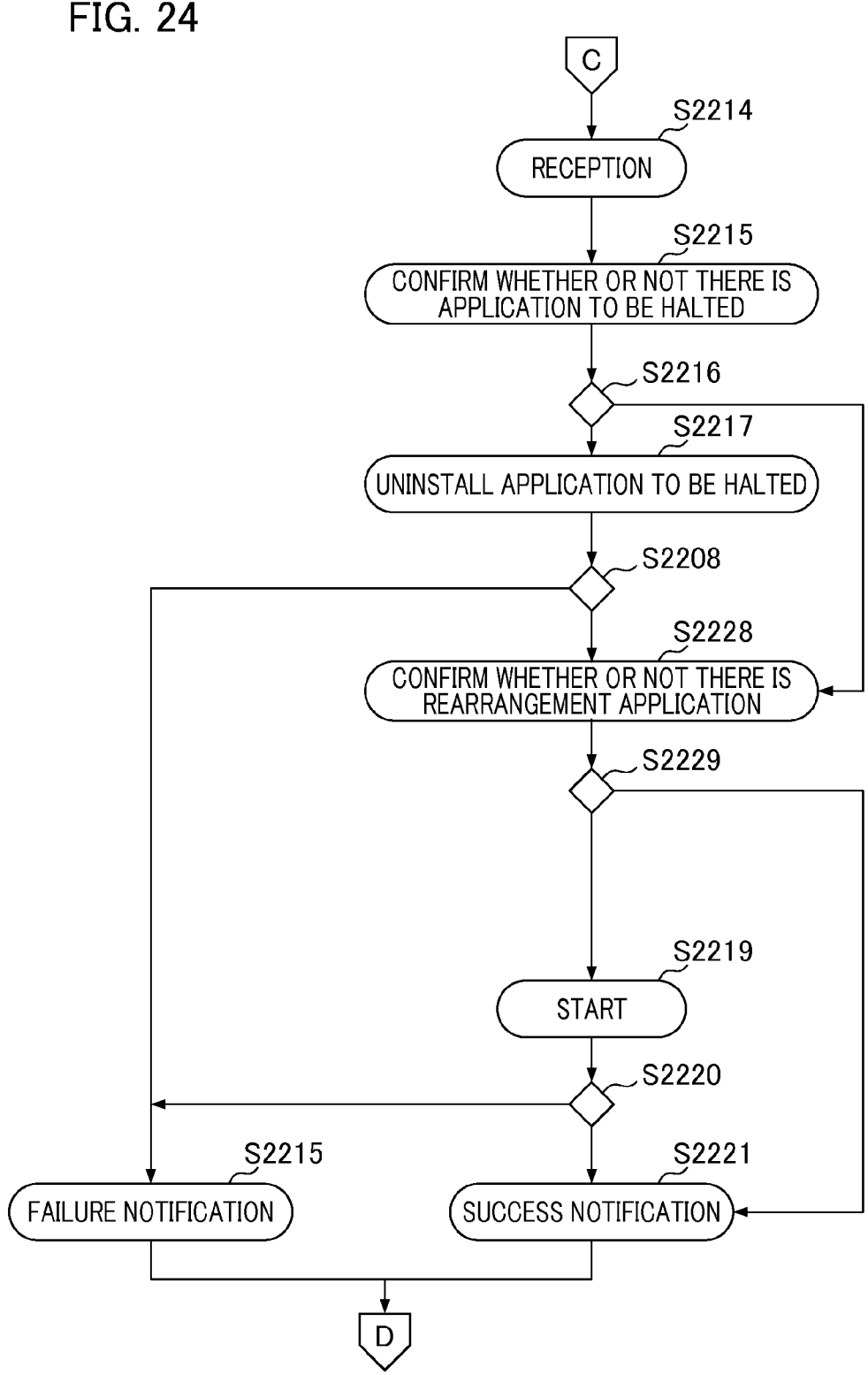
FIG. 24 is a diagram (2) illustrating operation processing by an image processing apparatus that receives the rearrangement application start instruction.

FIGS. 23 and 24 are diagrams illustrating operation processing by the image processing apparatus that receives a rearrangement application start instruction. The terminal device 102 executes the following processing according to an operation by an administrator who has confirmed the completion status of relocation of the application displayed on the screen in step S2140 of FIG. 21. The terminal device 102 instructs the image forming apparatus 101 to start the installed rearrangement application. This instruction is hereinafter described as a rearrangement application start instruction. The rearrangement application start instruction functions as an activation request for the rearrangement application. In other words, the terminal device 102 generates the rearrangement application start instruction (step S2201), and transmits the rearrangement application start instruction to the image forming apparatus 101 (step S2202, S2203). In this example, the rearrangement application start instruction includes application rearrangement decided information shown in FIG. 18.

In step S2205, the application managing unit 392 provided in the device A or the device B accepts the rearrangement application start instruction. Then, the application managing unit 392 determines whether or not the same kind of application to be halted with the rearrangement application in the application rearrangement decided information included in the rearrangement application start instruction is included in the host device (steps S2206 and S2207). When the application to be halted is not provided in the host device, the process advances to step S2226. When the application to be halted is provided in the host device, the application managing unit 392 uninstalls the application to be halted (step S2208).

Next, the application managing unit 392 determines the success and failure of the uninstallation of the application to be halted (step S2209). When the uninstallation of the application to be halted has succeeded, the application managing unit 392 notifies the terminal device 102 of the success of the process (step S2212). When the uninstallation of the application to be halted has failed, the application managing unit 392 notifies the terminal device 102 of the failure of the process (step S2213).

Next, the application managing unit 392 confirms/determines whether or not the rearrangement application is installed on the host device (steps S2226 and S2227). When the rearrangement application is not installed on the own device, the process advances to step S2212.

When the rearrangement application is installed on the host device, the application managing unit 392 starts the rearrangement application (step S2210). In other words, the application managing unit 392 activates the rearrangement application according to the accepted rearrangement application start instruction. Subsequently, the application managing unit 392 determines the success and failure of the start of the rearrangement application (step S2211). When start of the rearrangement application has failed, the process advances to step S2213. When the start of the rearrangement application has succeeded, the process advances to step S2212. Then, the application managing unit 392 notifies the terminal device 102 of an activation completion (step S2212).

In steps S2223 and S2224, the terminal device 102 receives the activation completion for the rearrangement application. Then, the terminal device 102 displays an activation completion status of the application on the screen (step S2225).

The processes in steps S2214 to S2221 shown in FIG. 24 is executed by the device C. Since the processes in steps S2214 to S2221 are the same processes as those in step S2205 to S2212, a detailed description is omitted. In this example, in step S2229, the application managing unit 392 determines that the rearrangement applications (the App_A to the App_C) are included in the host device. Thus, in step S2219, the application managing unit 392 starts these rearrangement applications. After the processes in steps S2215, S2221, the process advances to S2224 in FIG. 23.

According to operation processing by information processing system of the present embodiment described with reference to FIGS. 21 to 24, the following effects are ensured. Specifically, the application can be optimally located depending on the image forming apparatus after being rearranged when the image forming apparatus of which the configuration date is managed by the management apparatus on a network is rearranged. Specifically, applications or licenses that have been applied to the image forming apparatus before being relocated are optimally relocated depending on the number or a model of the image forming apparatus after being relocated.
<Reflection of Application Rearrangement Decided Information by Terminal Device and Server Computer Group>

Figure 25:
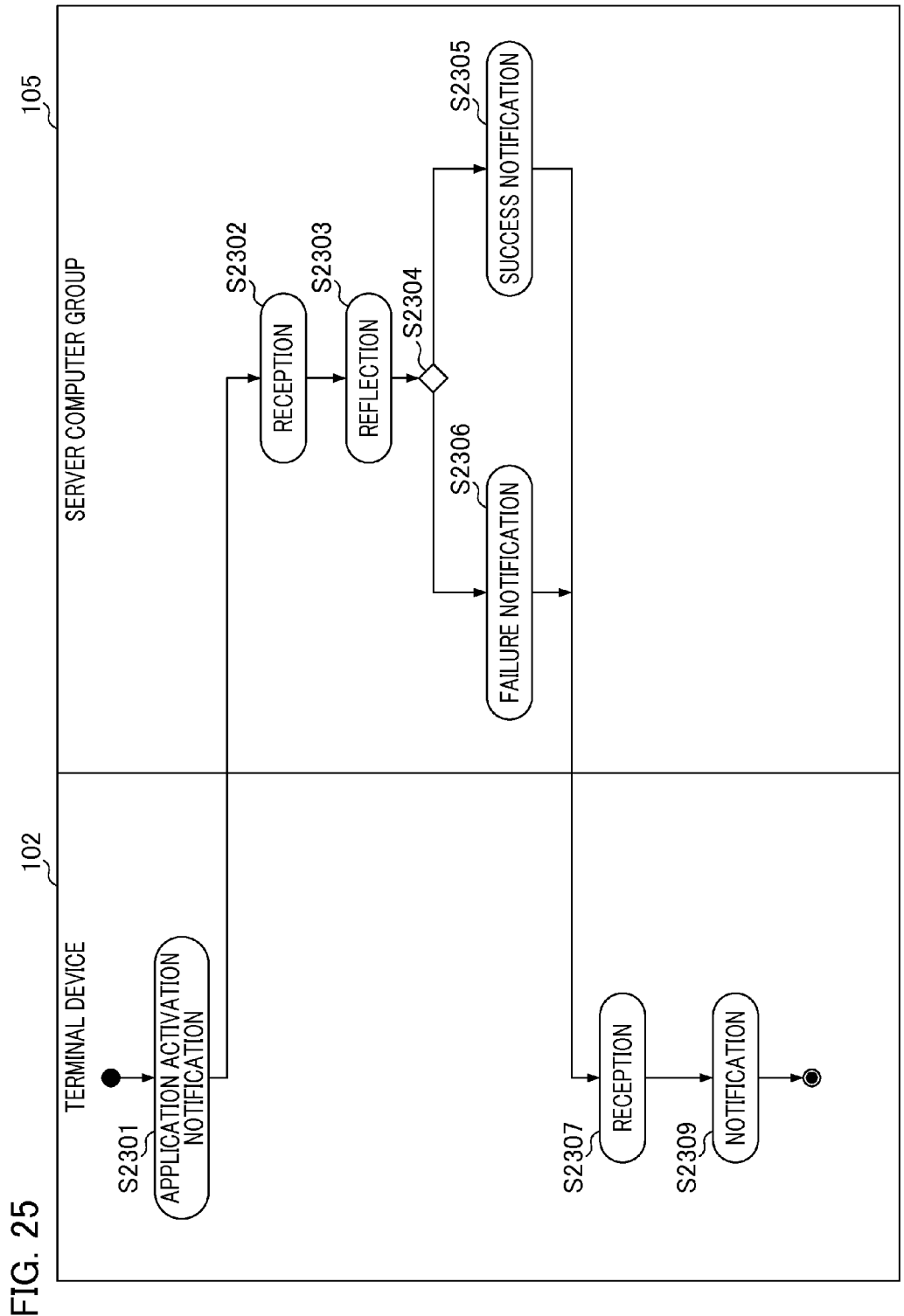
FIG. 25 is a flowchart illustrating reflection processing of application rearrangement decided information with respect to a contract management service.

FIG. 25 is a flowchart illustrating reflection processing of application rearrangement decided information in the contract management service. The terminal device 102 transmits an application activation notification to the contract management service 1101 in response to an operation by an administrator who has confirmed the activation completion status of the application displayed on the screen in the process in step S2225 shown in FIG. 23(step S2301). The application activation notification is information indicating that the application after being relocated has activated. The application activation notification includes application rearrangement decided information shown in FIG. 26. In the application rearrangement decided information, "t" indicating that the application activates is set as an operation status "status" of each application. Thus, for example, depending on the activation completion status of the application, the terminal device 102 edits application rearrangement decided information shown in FIG. 18 into application rearrangement decided information shown in FIG. 26.

Next, the application information acquiring unit 394 of the contract management service 1101 receives the application activation notification (step S2302). Subsequently, the application arranging unit 395 reflect the application rearrangement decided information (FIG. 26) included in the application activation notification in tenant-specific application information held by the tenant-specific application information holding unit 396 (step S2303). In this manner, for example, tenant specific device information shown in FIG. 6A is updated to tenant specific device information shown in FIG. 27A. Also, device specific information shown in FIG. 6B is updated to device specific information in FIG. 27B. In the example shown in FIG. 27B, the application arranging unit 395 creates records corresponding to the device identifier "CCC00005" according to the number of the rearrangement applications.

Referring back to FIG. 25, the application arranging unit 395 determines the success and failure of reflection processing for tenant-specific application information (step S2304). When the reflection processing for tenant-specific application information has succeeded, the application arranging unit 395 notifies the terminal device 102 of the processing result (the success of processing) (step S2305). When the reflection processing for tenant-specific application information has failed, the application arranging unit 395 notifies the terminal device 102 of the processing result (failure of processing) (step S2306).

Next, the terminal device 102 receives the processing result from the application arranging unit 395 of the contract management service 1101(step S2307). Then, the terminal device 102 displays the application completion status on the screen on the basis of the processing result (step S2309).

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-054082 filed Mar. 12, 2012, which is hereby incorporated by reference herein in its entirety.

What is claimed is:

1. An information processing system comprising:
an image forming apparatus; and
a management apparatus that manages the image forming apparatus,
wherein the management apparatus comprises:
a managing unit configured to manage operation setting information for switching an operation of the image forming apparatus and transmit, to the image forming apparatus, the operation setting information corresponding to the image forming apparatus in response to an acquisition request for the operation setting information from the image forming apparatus; and
a first application managing unit configured to manage an application to be applied to the image forming apparatus,
wherein the image forming apparatus comprises:
a requesting unit configured to transmit the acquisition request for the operation setting information to the management apparatus, and acquire the operation setting information from the management apparatus as a response to the acquisition request; and
a second application managing unit configured to manage the application to be applied to the image forming apparatus,
wherein the first application managing unit comprises:
a receiving unit configured to receive a relocation request including relocation information relating to relocation of the application to be applied to the image forming apparatus, the relocation request being required as a result of the rearrangement of the image forming apparatus;
a transmitting unit configured to decide an application corresponding to the image forming apparatus after being rearranged as a rearrangement application based on the relocation information included in the relocation request, and transmit rearrangement information relating to the image forming apparatus after being rearranged and the rearrangement application to a user device;
a distributing unit configured to distribute the rearrangement application to the image forming apparatus after being rearranged upon request of the image forming apparatus after being relocated, and
wherein the second application managing unit comprises:
an accepting unit configured to accept an application rearranging instruction to be applied that includes the rearrangement information and for applying from the user device;
a determining unit configured to determine whether or not applying the rearrangement application to the image forming apparatus is required based on the rearrangement information included in the application rearranging instruction;
an acquiring unit configured to request a distribution of a rearrangement application to the management apparatus when it is determined that applying the rearrangement application to the image forming apparatus is required, and acquire the rearrangement application from the management apparatus; and
an applying unit configured to apply the acquired rearrangement application.

2. The information processing system according to claim 1, wherein the relocation request includes at least attribute information having an application operational condition of the image forming apparatus after being relocated and attribute information of an applying target application of which applying to the image forming apparatus after being rearranged is requested by the user device, wherein the rearrangement information includes at least attribute information of the image forming apparatus after being relocated and attribute information of the rearrangement application to be applied to the image forming apparatus after being relocated, wherein the transmitting unit specifies the application operational condition corresponding to the applying target application based on the attribute information of the applying target application included in the relocation request and operational condition information relating to the application operational condition of the image forming apparatus stored in a storage unit in advance, and when the specified application operational condition matches the application operational condition of the image forming apparatus after being relocated included in the relocation request, decides the applying target application as the rearrangement application, and
wherein the determining unit determines whether or not the image forming apparatus after being relocated is a host device based on the attribute information of the image forming apparatus after being relocated included in the rearrangement information, and determines that applying the rearrangement application to the host device is required when the image forming apparatus after being relocated is the host device.

3. The information processing system according to claim 2, wherein, when the specified application operational condition does not match the application operational condition of the image forming apparatus after being relocated included in the relocation request, the transmitting unit searches for an application that matches the application operational condition of the image forming apparatus after being relocated among applications of which a kind is the same as but a version is different from the applying target application based on the operational condition information and decides the searched application to be the rearrangement application.

4. The information processing system according to claim 1, wherein the second application managing unit further comprises a halting unit configured to halt the application included in the rearrangement application acquired by the acquiring unit among applications that have been applied to a host device, and wherein the applying unit accepts an activation request of the acquired rearrangement application to thereby activate the rearrangement application.

5. The information processing system according to claim 4, wherein when the image forming apparatus after being relocated is not the host device, the determining unit determines that there is no rearrangement application to be applied to the host device, and the halting unit halts the application included in the rearrangement application among the applications that have been applied to the host device.

6. A method for controlling an image forming apparatus in an information processing system comprising the image forming apparatus, and a management apparatus that manages the image forming apparatus, the method comprising:
transmitting, by the image forming apparatus, an acquisition request of operation setting information to the management apparatus, and acquiring the operation setting information from the management apparatus as a response to the acquisition request; managing, by the management apparatus, operation setting information for switching an operation of the image forming apparatus and transmitting operation setting information corresponding to the image forming apparatus in response to an acquisition request for the operation setting information from the image forming apparatus;

managing, in a first management step performed by the management apparatus, an application to be applied to the image forming apparatus;

managing, in a second management step performed by the image forming apparatus, the application to be applied to the image forming apparatus, wherein the first management step performed by the management apparatus further comprises: receiving, by the management apparatus, a relocation request including relocation information relating to a relocation of the application to be applied to the image forming apparatus, the relocation request being required as a result of a rearrangement of the image forming apparatus; deciding, by the management apparatus, an application corresponding to the image forming apparatus after being rearranged as a rearrangement application based on the relocation information included in the relocation request, and transmitting rearrangement information relating to the image forming apparatus after being rearranged and the rearrangement application to a user device; distributing, by the management apparatus, the rearrangement application to the image forming apparatus after being rearranged upon request of the image forming apparatus after being relocated, and wherein the second management step performed by the image forming apparatus further comprises:

accepting, by the image forming apparatus from the user device, an application rearranging instruction that includes the rearrangement information to be applied; determining, by the image forming apparatus, whether or not applying the rearrangement application to the image forming apparatus is required based on the rearrangement information included in the application rearranging instruction; requesting, by the image forming apparatus, a distribution of the rearrangement application to the management apparatus when it is determined that applying the rearrangement application to the image forming apparatus is required, and acquiring the rearrangement application from the management apparatus; and applying, by the image forming apparatus, the acquired rearrangement application.

7. A non-transitory storage medium on which is stored a computer program for making a computer execute a method for controlling an image forming apparatus in an information processing system comprising the image forming apparatus, and a management apparatus that manages the image forming apparatus, the method comprising: transmitting, by the image forming apparatus, an acquisition request of operation setting information to the management apparatus, and acquiring the operation setting information from the management apparatus as a response to the acquisition request; managing, by the management apparatus, operation setting information for switching an operation of the image forming apparatus and transmitting operation setting information corresponding to the image forming apparatus in response to an acquisition request for the operation setting information from the image forming apparatus; managing, in a first management step performed by the management apparatus, an application to be applied to the image forming apparatus; managing, in a second management step performed by the image forming apparatus, the application to be applied to the image forming apparatus, wherein the first management step performed by the management apparatus further comprises: receiving, by the management apparatus, an relocation request including relocation information relating to the relocation of the application to be applied to the image forming apparatus, the relocation request being required as a result of a rearrangement of the image forming apparatus; deciding, by the management apparatus, an application corresponding to the image forming apparatus after being rearranged as a rearrangement application based on the relocation information included in the relocation request, and transmitting rearrangement information relating to the image forming apparatus after being rearranged and the rearrangement application to a user device; distributing, by the management apparatus, the rearrangement application to the image forming apparatus after being rearranged upon request of the image forming apparatus after being relocated, and wherein the second management step performed by the image forming apparatus further comprises: accepting, by the image forming apparatus from the user device, an application rearranging instruction that includes the rearrangement information to be applied; determining, by the image forming apparatus, whether or not applying the rearrangement application to the image forming apparatus is required based on the rearrangement information included in the application rearranging instruction; requesting, by the image forming apparatus, a distribution of the rearrangement application to the management apparatus when it is determined that applying the rearrangement application to the image forming apparatus is required, and acquiring the rearrangement application from the management apparatus; and applying, by the image forming apparatus, the acquired rearrangement application.

\* \* \* \* \*